(12) United States Patent  (10) Patent No.: US 9,294,659 B1
Bednarik et al.  (45) Date of Patent: Mar. 22, 2016

(54) DEVICE AND ASSEMBLY FOR COUPLING AN EXTERNAL OPTICAL COMPONENT TO A PORTABLE ELECTRONIC DEVICE

(71) Applicant: The Quadrillion Group, LLC, Gilbert, AZ (US)

(72) Inventors: Jason Garrett Bednarik, Gilbert, AZ (US); Emily Marie Hovater, Gilbert, AZ (US); Fred Lance Hovater, Mesa, AZ (US)

(73) Assignee: The Quadrillion Group, LLC, Gilbert, AZ (US)

( * ) Notice: Subject to any disclaimer, the term of this patent is extended or adjusted under 35 U.S.C. 154(b) by 0 days.

(21) Appl. No.: 14/165,254

(22) Filed: Jan. 27, 2014

Related U.S. Application Data

(60) Provisional application No. 61/756,872, filed on Jan. 25, 2013.

(51) Int. Cl.
*H04N 5/225* (2006.01)
(52) U.S. Cl.
CPC .................................. *H04N 5/2254* (2013.01)
(58) Field of Classification Search
CPC ........................................................ H04N 5/225
USPC ........................................ 455/575.8; 348/375
See application file for complete search history.

(56) References Cited

U.S. PATENT DOCUMENTS

| | | | |
|---|---|---|---|
| 6,993,573 B2 | 1/2006 | Hunter | |
| 8,279,544 B1 * | 10/2012 | O'Neill | 359/827 |
| 2007/0280677 A1 | 12/2007 | Drake et al. | |
| 2009/0181729 A1 | 7/2009 | Griffin et al. | |
| 2011/0292198 A1 | 12/2011 | Lapstun et al. | |
| 2012/0018322 A1 | 1/2012 | Mongan et al. | |
| 2013/0206614 A1 * | 8/2013 | O'Neill et al. | 206/216 |
| 2013/0300919 A1 * | 11/2013 | Fletcher et al. | 348/360 |
| 2014/0051923 A1 * | 2/2014 | Mirza et al. | 600/103 |
| 2014/0119718 A1 * | 5/2014 | Oh et al. | 396/448 |
| 2014/0171150 A1 * | 6/2014 | Hurst et al. | 455/556.1 |

OTHER PUBLICATIONS http://www.maclife.com/article/iphone/apple_applies_clip_camera_lens_patent, "Apple Applies for Clip on Camera Lens Patent | MaclLife", May 22, 2012.

(Continued)

*Primary Examiner* — Anthony J Daniels
(74) *Attorney, Agent, or Firm* — Booth Udall Fuller, PLC

(57) ABSTRACT

An assembly for coupling an external optical component to a portable electronic device is disclosed. The assembly includes a portable electronic device case having two sidewalls extending from a rear wall, a camera opening extending through the rear wall, a rear groove on an outer surface of the rear wall, and a side groove on a sidewall. Also included is an optical component coupling configured to removably couple to the portable electronic device case. The optical component coupling includes a face plate, a side plate, a rear tongue positioned to engage with the rear groove, a side tongue positioned to engage with the side groove, an optical component mount positioned to align with the camera opening. The optical component comprises one of a spectrometer, a magnifying optical component, a light filter, a telescope, a night vision optical component, a spotting scope, and a bore scope.

19 Claims, 17 Drawing Sheets

(56) References Cited

OTHER PUBLICATIONS http://www.technews24h.com/2012/05/gizmon-clip-on-camera-lenses-for-iphone.html, "Gizmon Clip-on Camera Lenses for iPhone and iPad ~ Tech News 24h", TN24h Tech News, May 22, 2012.

http://www.jr.com/ikogeto/pe/KGT_DOT0101V/, "Kogeto Dot—360 Degree Video Lens Camera for iPhone 4 and 4S—Pitch Black", May 22, 2012.

http://olloclip.com/Webstore/Order.html, "Ollo Clip Changing The Way We View The World . . . ", May 22, 2012.

* cited by examiner

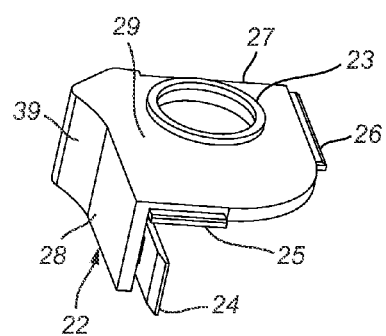
FIG. 5
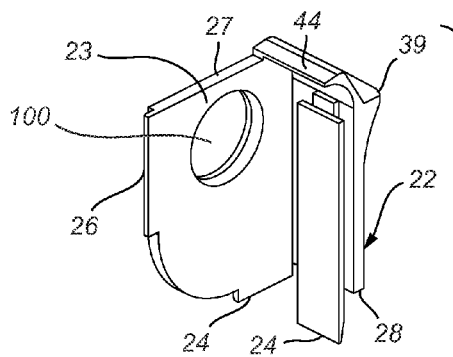
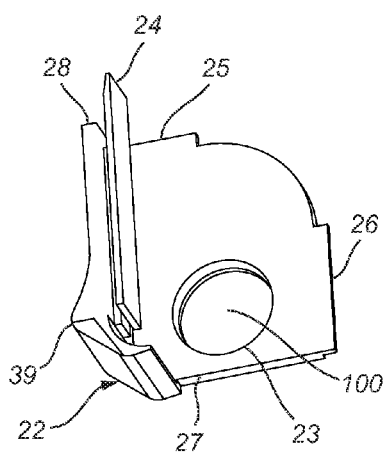
FIG. 6
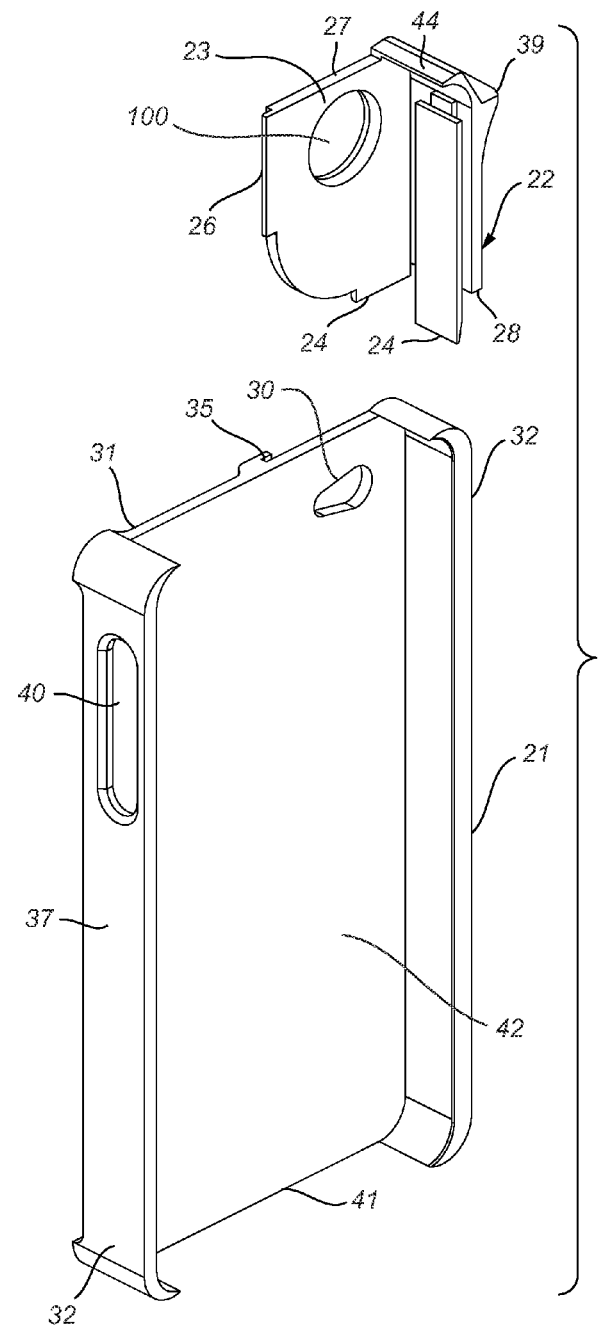
FIG. 7

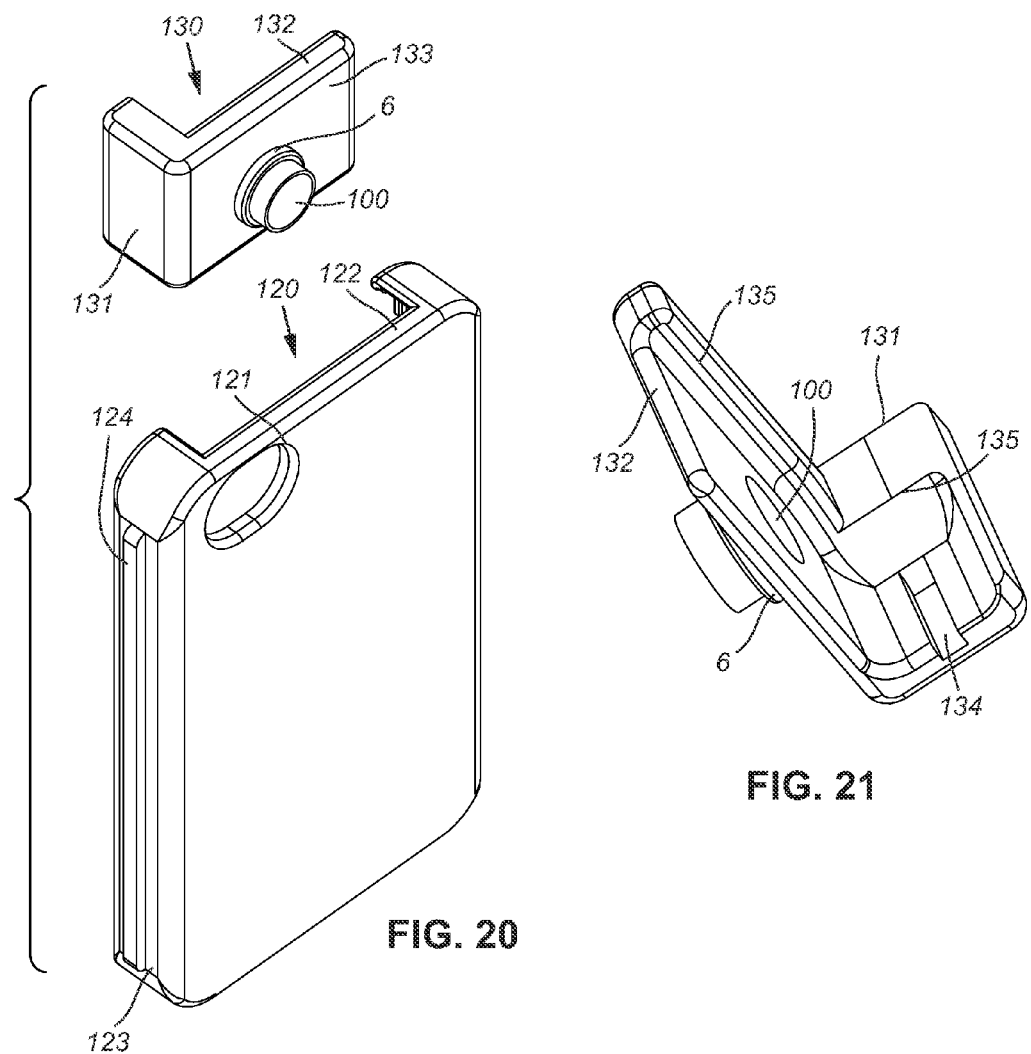
FIG. 20
FIG. 21
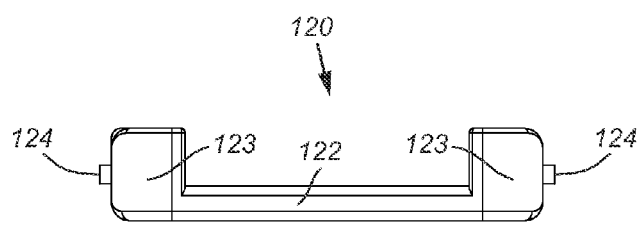
FIG. 22

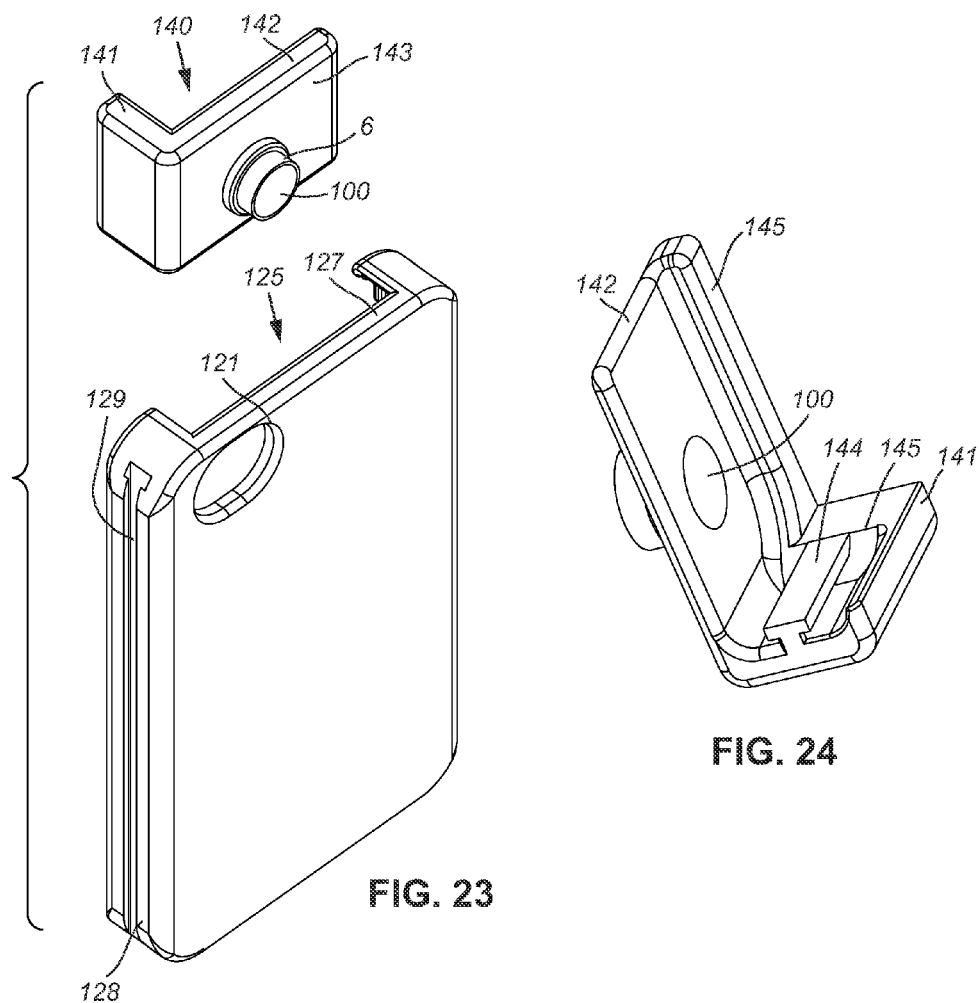
FIG. 23
FIG. 24
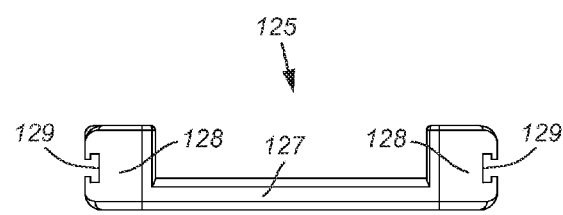
FIG. 25

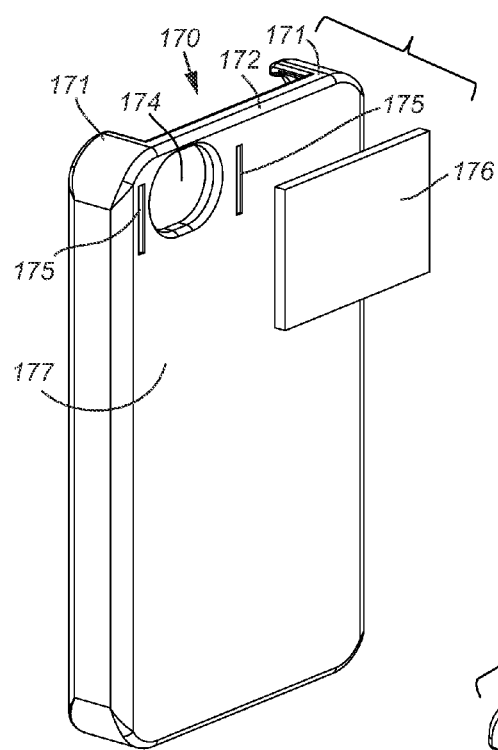
FIG. 32
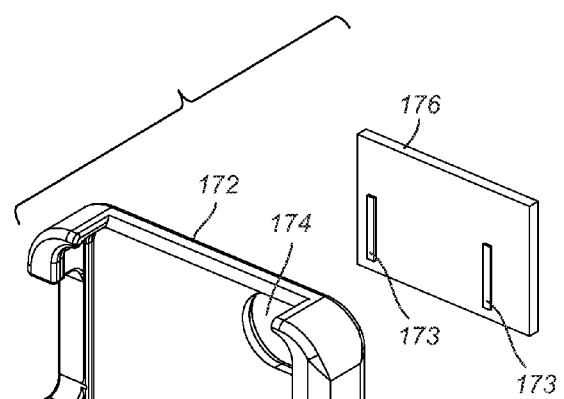
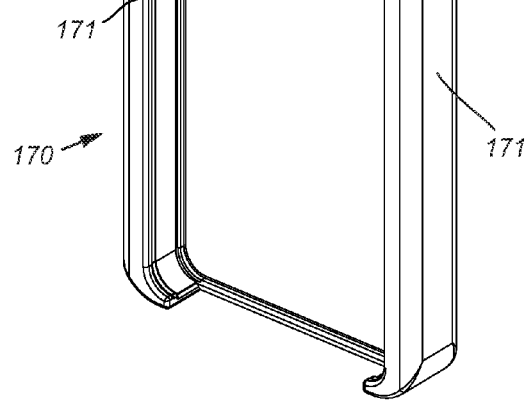
FIG. 33

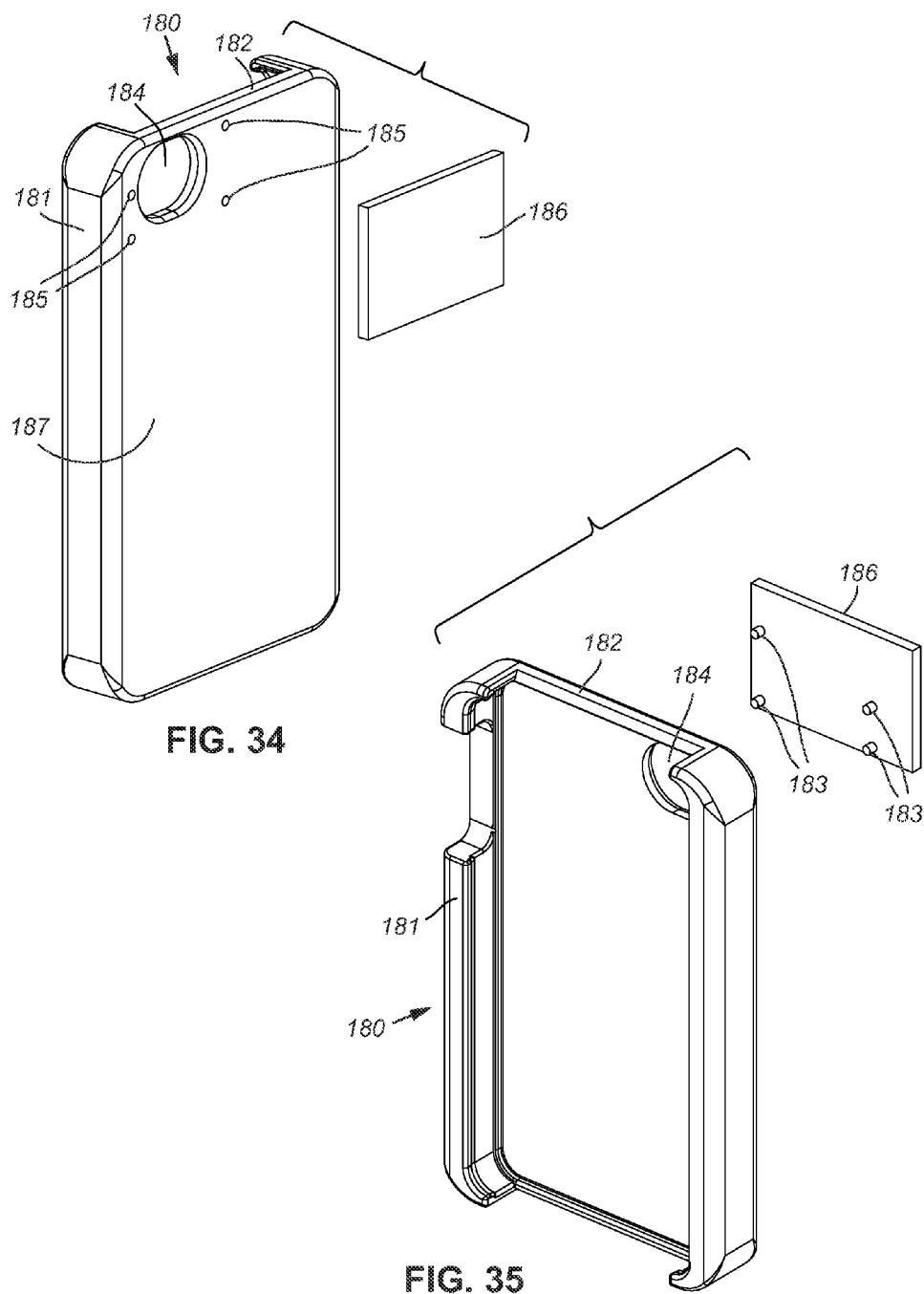

DEVICE AND ASSEMBLY FOR COUPLING AN EXTERNAL OPTICAL COMPONENT TO A PORTABLE ELECTRONIC DEVICE

CROSS REFERENCE TO RELATED APPLICATIONS

This document claims the benefit of the filing date of U.S. Provisional Patent Application 61/756,872, entitled "Device and Assembly for Attaching External Optical Components to a Portable Electronic Device" to Bednarik, which was filed on Jan. 25, 2013, the contents of which are hereby incorporated by reference.

BACKGROUND

1. Technical Field

Aspects of this document relate generally to a device and an assembly for coupling external optical components to a portable electronic device such as a cell phone.

2. Background Art

The portable media player market has changed dramatically in the past several years and with it, the portable media player case market. Recent trends have focused on the emergence of the mobile media device, which simply put is a handheld phone incorporating several additional features not found in traditional handheld phones.

Mobile media devices can include one or more of the following features: the merging of a personal data/digital assistant (PDA) and a cellular phone; a keyboard interface (e.g., a QWERTY keyboard) configuration as either a touch screen or tactile keyboard; the capability to receive/download audio/video files. Furthermore, mobile media devices can: run an operating system software providing a standardized interface and platform for application developers; include advanced features like e-mail, Internet access and e-book reader capability; and/or include a built-in full keyboard or external USB keyboard and VGA connector. Mobile media devices can also include sophisticated multimedia functionality such as audio/video recording and playback capabilities previously only available in specific devices such as cameras, video cameras, and video players.

In other words, a mobile media device can be considered a miniature computer that has telephone capability and one or more multimedia capabilities that were previously reserved to many specific individual devices. Examples of mobile media devices include: the iPhone® product by Apple Inc. of Cupertino, Calif., the Blackberry® product by Research In Motion (RIM) of Waterloo, Ontario, Canada, and the Android® devices produced by Nokia of Keilaniemi, Espoo, Finland, LG Corp. of Seoul, South Korea and Samsung Group of Seoul, South Korea.

Photographic and videographic devices have also undergone significant changes in recent years. Digital cameras are widely available and even simple entry-level cameras often have video recording capabilities. Since the introduction of mobile phones, and later, mobile media devices that incorporated built-in cameras with video recording capabilities, the trend has focused on integrating what once were point-specific devices into robust multimedia platforms, as evidenced by the dominance of multimedia as one of several synergistic features offered by recent mobile media devices. Technological advances have made all but the most advanced digital cameras and camcorders obsolete. Many mobile media devices offer built-in cameras that exceed, by an order of magnitude, functionality that was only available in high-end specialty equipment only a generation earlier.

All of these devices have benefited from the breadth and depth of technological advances, ranging from miniaturization of electrical and electronic components, to the increasing power and efficiency of microprocessors, to large quantities of digital storage. In short, capabilities and market adoption are increasing while cost and physical size are decreasing—a steady improvement in the price-to-performance ratio as a consequence of diffusion into the global marketplace.

Following the introduction of mobile media devices, mobile media device cases were introduced. Cases are intended to provide physical protection for mobile media devices and the ability for users to more easily handle and use a mobile media device. They can also provide various types of aesthetic qualities. In some instances, cases offer a simple mechanical function that provides better usability or convenience.

The nexus of these developments and trends represents the current state-of-the-art. Mobile media devices are essentially handheld, highly portable multimedia-capable computers. It is now possible to take photos, record video, compose correspondence, and communicate it in near real-time over the Internet, all by using the same mobile media device.

Mobile media devices and their cases serve complementary though largely unrelated functions. The case is merely an accessory that provides a few simple features such as protecting the surfaces of the mobile media device, or providing a different surface material to enhance ergonomics usability, or providing aesthetic benefits.

Unfortunately, current mobile media device cases have many shortcomings. Some attempts have been made to create entire mobile media device cases with a fixed optics assembly, but none have the ability to use interchangeable optics assemblies that couple to, and remove from, the mobile media device case without additional tools. The current state-of-the-art either does not offer this feature or requires the user to have in his possession multiple cases, such that he must use a specific case for a specific function such as attaching a microscope to enhance the built-in camera's optical capabilities. Requiring the user to have multiple cases is not only costly, but is both impractical and inefficient. A mobile media device case having fixed optics, such as a microscope, is undesirable because the user cannot easily stow this case on his person and he must have another case when he wishes to afford the benefits of a case without the additional functionality

SUMMARY

According to one aspect, an assembly for coupling an external optical component to a portable electronic device comprises a portable electronic device case and an optical component coupling. The portable electronic device case comprises a rear wall having an inner and an outer surface opposite the inner surface, two opposing sidewalls extending from the inner surface of the rear wall, a camera opening extending through the rear wall, at least one rear groove on the outer surface of the rear wall, and at least one side groove on a first sidewall of the two opposing sidewalls. The optical component coupling is configured to removably couple to the portable electronic device case. The optical component coupling comprises a face plate, a side plate coupled to the face plate, at least one rear tongue positioned on the face plate to engage with the at least one rear groove when the optical component coupling is coupled to the portable electronic device case, at least one side tongue positioned on the side plate to engage with the at least one side groove when the optical component coupling is coupled to the portable electronic device case, an optical component mount adjacent the face plate and positioned to align with the camera opening when the optical component coupling is coupled to the portable electronic device case, and a shoulder positioned on the optical component coupling to abut the portable electronic device case when the optical component mount is aligned with the camera opening.

Various implementations and embodiments may comprise one or more of the following. The optical component mount may extend from an outer surface of the face plate and comprise an optical component opening aligned with the camera opening and extending through the face plate. The at least one rear tongue may comprise at least two rear tongues, the at least one rear groove may comprise at least two rear grooves, and the camera opening may be positioned between two of the at least two rear grooves. A rib may be disposed in at least a first rear groove of the at least two rear grooves positioned between the camera opening and the first sidewall, and a depression may be on a first rear tongue of the at least two rear tongues positioned between the optical component mount and the side plate. The depression may be disposed on the first rear tongue to engage with the rib when the optical component coupling is coupled to the portable electronic device case. The at least one side groove may comprise one side groove positioned on the first sidewall opposite the first rear groove, and the at least one side tongue may comprise one side tongue positioned on a front plate of the optical component coupling extending from the side plate opposite the face plate. The side groove may comprise a rib and the side tongue may comprise a depression positioned to engage with the rib of the side groove when the optical component coupling is coupled to the portable electronic device case. A gripping element may extend from the optical component coupling. The at least two grooves may comprise at least two primary grooves and the portable electronic device case may further comprise one or more second grooves perpendicular to the primary grooves on the outer surface of the rear wall. The at least one rear groove may comprise one rear groove comprising a rib, the at least one side groove may comprise one side groove comprises one side groove comprising a rib, the at least one rear tongue may comprise one rear tongue comprising a depression positioned to engage with the rib of the rear groove when the optical component coupling is coupled to the portable electronic device case, and the at least one side tongue may comprise one side tongue comprising a depression positioned to engage with the rib of the side groove when the optical component coupling is coupled to the portable electronic device case and the optical component opening is aligned with the camera opening. The at least one rear groove may be positioned between a protrusion on the outer surface of the rear wall and the outer surface of the rear wall. The at least one rear groove may comprise a substantially vertical first groove and a substantially horizontal second groove, and the at least one rear tongue comprises a first tongue positioned to engage with the first groove and a second tongue positioned to engage with the second groove when the optical component coupling is coupled to the portable electronic device case. The side tongue may comprise a T-shaped side tongue and the side groove comprises a T-shaped side groove. The optical component may be coupled to the optical component mount and may comprise one of a spectrometer, a magnifying optical component, a light filter, a telescope, a night vision optical component, a spotting scope, and a bore scope.

According to another aspect, a portable electronic device case comprises a rear wall comprising an inner surface and an outer surface opposite the inner surface, at least two rear grooves on the outer surface of the rear wall, the at least two rear grooves being substantially parallel to one another, two opposing sidewalls extending from the inner surface of the rear wall, a side groove on a first sidewall of the two opposing sidewalls, and a camera opening extending through the rear wall and positioned between two of the at least two rear grooves on the outer surface.

Various implementations and embodiments may comprise one or more of the following. An optical component coupling configured to removably and slidably couple to the portable electronic device case, the optical component coupling comprising a face plate, a side plate coupled to the face plate, at least two rear tongues positioned on the face plate to slidably engage with the at least two rear grooves when the optical component coupling is coupled to the portable electronic device case, a first side tongue positioned on the side plate to slidably engage with the side groove when the optical component coupling is coupled to the portable electronic device case, an optical component opening extending through the face plate and positioned to align with the camera opening when the optical component coupling is coupled to the portable electronic device case, and a shoulder positioned on the optical component coupling to abut the portable electronic device case when the optical component opening is aligned with the camera opening. An optical component coupled to the face plate and aligned with the optical component opening, the optical component comprising at least one of a spectrometer, a magnifying optical component, a light filter, a telescope, a night vision optical component, a spotting scope, and a bore scope. A second side tongue on the side plate opposite the face plate and substantially parallel to the first side tongue, the first and second side tongues positioned to hold a portion of the side plate between the first and second side tongues when the optical component coupling is coupled to the portable electronic device case. One or more ribs in at least one of side groove or the at least two rear grooves. One or more depressions on at least one of the side tongue or the at least two rear tongues, the one or more depressions positioned to engage with the one or more ribs when the optical component coupling is coupled to the portable electronic device case and the optical component opening is aligned with the camera opening.

According to another aspect, an optical component coupling for coupling an optical component to a portable electronic device case comprises a face plate, a side plate coupled to the face plate, at least one rear tongue positioned on the face plate to engage with at least one rear groove on the portable electronic device case, at least one side tongue positioned on the side plate to engage with at least one side groove on the portable electronic device case, a shoulder positioned on the optical component coupling to abut the portable electronic device case when the optical component coupling is coupled to the portable electronic device case, an optical component opening extending through the face plate and positioned to align with a camera opening on the portable electronic device case when the optical component coupling is coupled to the portable electronic device case, and an optical component coupled to the face plate and aligned with the optical component opening, the optical component comprising at least one of a spectrometer, a magnifying optical component, a light filter, a telescope, a night vision optical component, a spotting scope, and a bore scope.

Various implementations and embodiments may comprise one or more of the following. The at least one rear tongue may comprise one rear tongue comprising a depression positioned to engage with a rib on the rear groove of the portable electronic device case when the optical component coupling is coupled to the portable electronic device case, and the at least one side tongue may comprise one side tongue comprising a depression positioned to engage with a rib on the side groove of the portable electronic device case when the optical component coupling is coupled to the portable electronic device case and the optical component opening is aligned with the camera opening of the portable electronic device case. A gripping element extending from the optical component coupling.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 5 is a bottom perspective view of a second embodiment of an optical component coupling;

FIG. 6 is a rear perspective view of a second embodiment of an optical component coupling;

FIG. 7 is a rear perspective view of a second embodiment of an assembly for coupling an external optical component to a portable electronic device;

FIG. 20 is a front perspective view of a sixth embodiment of an assembly for coupling an external optical component to a portable electronic device;

FIG. 21 is a rear perspective view of an optical component coupling of a sixth embodiment of an assembly for coupling an external optical component to a portable electronic device;

FIG. 22 is a top view of a portable electronic device case of a sixth embodiment of an assembly for coupling an external optical component to a portable electronic device;

FIG. 23 is a front perspective view of a seventh embodiment of an assembly for coupling an external optical component to a portable electronic device;

FIG. 24 is a rear perspective view of an optical component coupling of a seventh embodiment of an assembly for coupling an external optical component to a portable electronic device;

FIG. 25 is a top view of a portable electronic device case of a seventh embodiment of an assembly for coupling an external optical component to a portable electronic device;

FIG. 32 is a front perspective view of a ninth embodiment of an assembly for coupling an external optical component to a portable electronic device;

FIG. 33 is a rear perspective view of a ninth embodiment of an assembly for coupling an external optical component to a portable electronic device;

FIG. 34 is a front perspective view of a tenth embodiment of an assembly for coupling an external optical component to a portable electronic device;

FIG. 35 is a rear perspective view of a tenth embodiment of an assembly for coupling an external optical component to a portable electronic device;

DESCRIPTION

Figure 1:
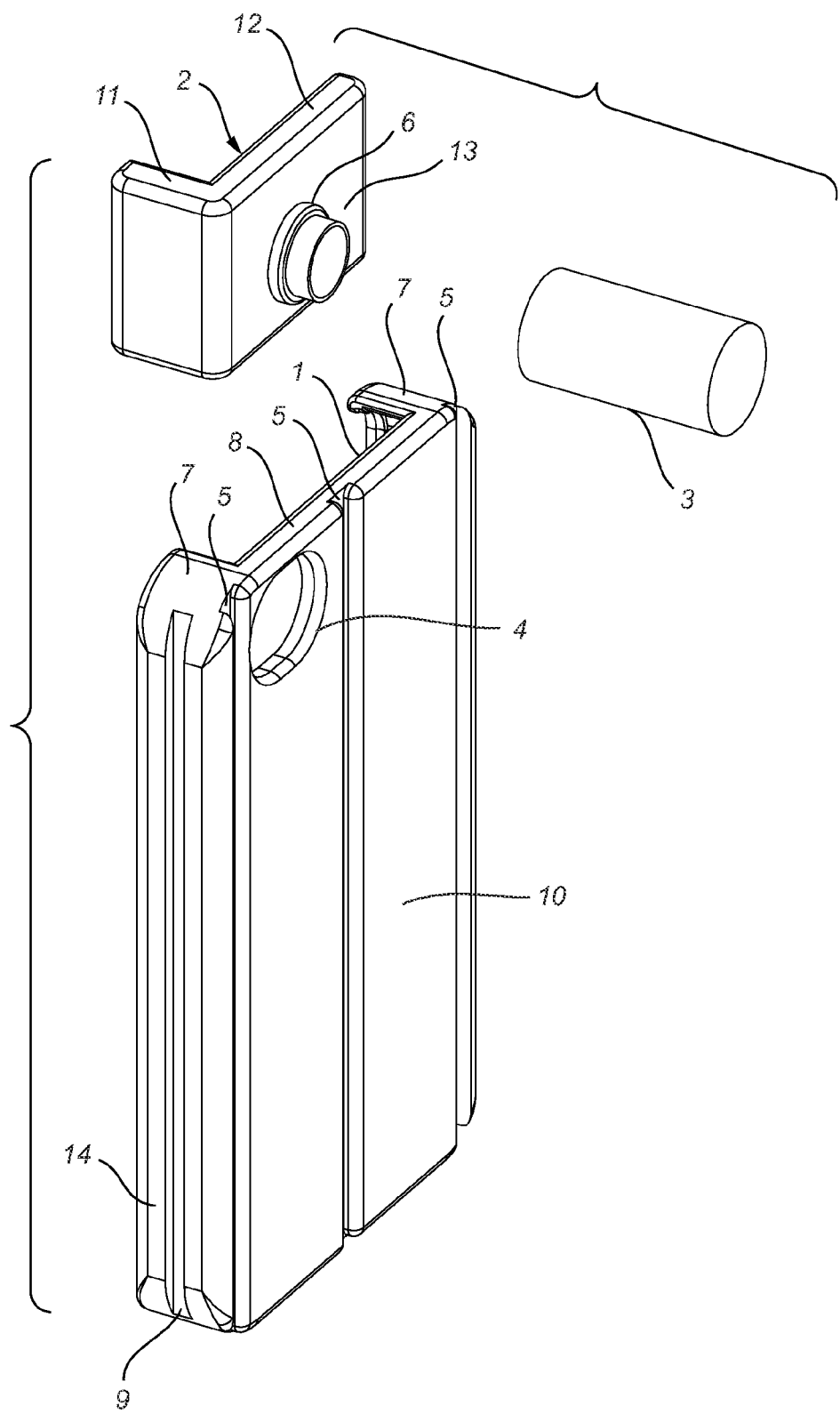
FIG. 1 is a front perspective view of a first embodiment of an assembly for coupling an external optical component to a portable electronic device.

This disclosure, its aspects and implementations, are not limited to the specific components or assembly procedures disclosed herein. Many additional components and assembly procedures known in the art consistent with the intended portable electronic device case and optical component coupling and/or assembly procedures for a portable electronic device case and optical component coupling will become apparent for use with implementations of portable electronic device cases and optical component couplings from this disclosure. Accordingly, for example, although particular portable electronic device case and optical component couplings are disclosed, such portable electronic device cases and optical component coupling sand implementing components may comprise any shape, size, style, type, model, version, measurement, concentration, material, quantity, and/or the like as is known in the art for such portable electronic device case and optical component coupling and implementing components, consistent with the intended operation of a portable electronic device case and an optical component coupling.

Various embodiments of the assemblies contemplated in this disclosure are configured to allow a user to easily couple and uncouple an optical component to a portable electronic device case partially housing a portable electronic device. As the portable electronic device may vary in size depending on the manufacturer and/or model, it is contemplated that the portable electronic device cases disclosed herein may be adapted to fit the particular portable electronic device without departing from the scope of the disclosure. Moreover, some features shown in the figures may be positioned elsewhere on the portable electronic device case in order to accommodate the features of the portable electronic device. For example, the camera openings, cord port slots, volume button slots, and power button slots, shown in the non-limiting figures may be positioned elsewhere on the portable electronic device case to accommodate the particular portable electronic device case without departing from the scope of this disclosure. Furthermore, although exemplary non-limiting optical components are depicted in the figures, it is contemplated that the optical component shown may comprise any one of a spectrometer, a magnifying optical component, a light filter, a telescope, a night vision optical component, a spotting scope, and a bore scope.

In one or more embodiments, an optical component coupling may removably couple to a portable electronic device case for a portable electronic device so as to align with a camera opening disposed through a corner of the portable electronic device case. The optical component coupling may, in some embodiments, include an objective mounting surface that is one of calculated for use with a focal point of a camera in the portable electronic device and adjustable relative to the case to enable dynamic adjustment of focal length. In some embodiments described herein, the objective mounting surface is referred to as an optical component mount. As shall be shown and described in greater detail hereafter, the optical component coupling may removably couple to the portable electronic device case via a tongue and groove arrangement or some other type of attachment geometry arrangement.

Figure 2:
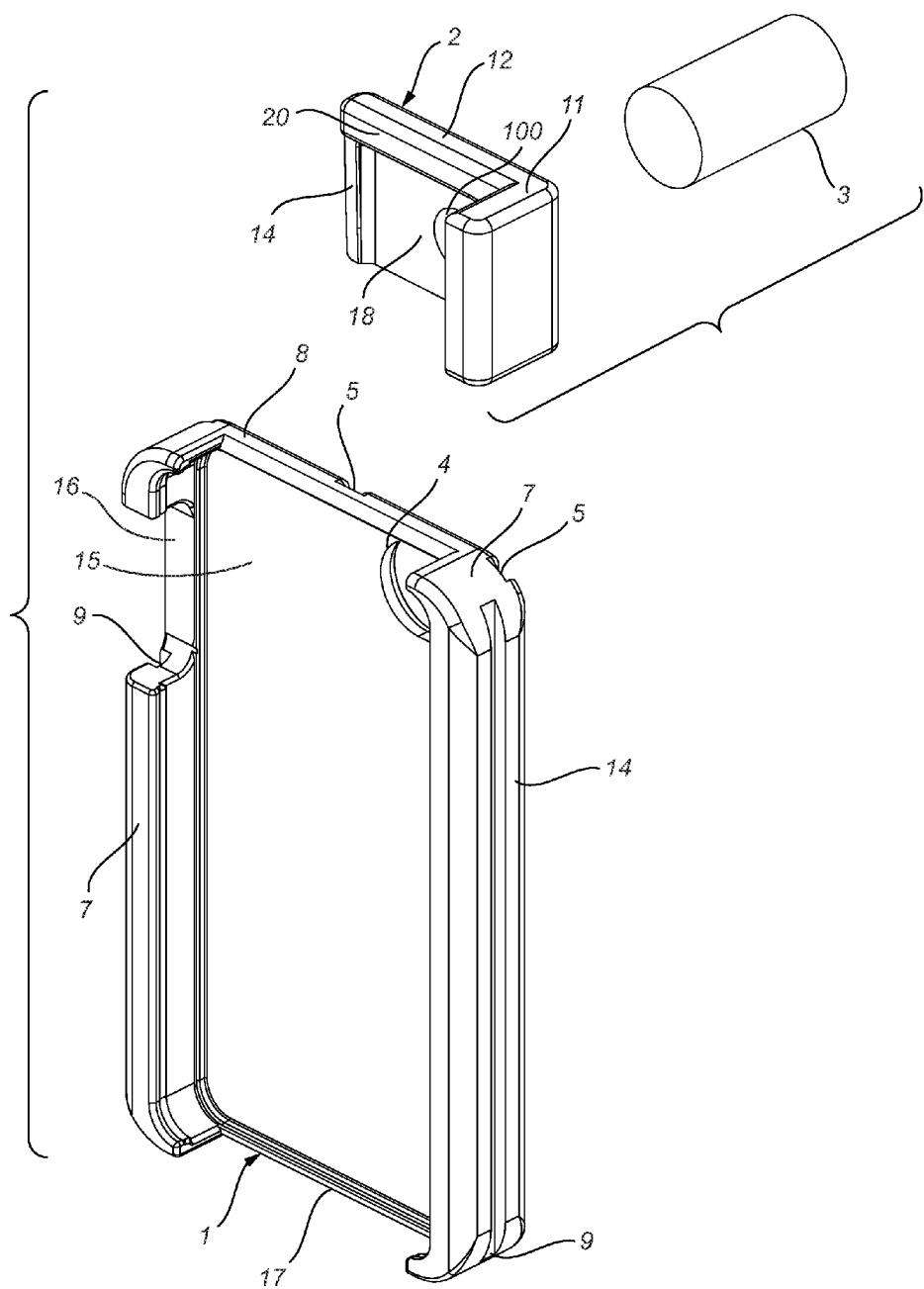
FIG. 2 is a rear perspective view of a first embodiment of an assembly for coupling an external optical component to a portable electronic device.
Figure 3:
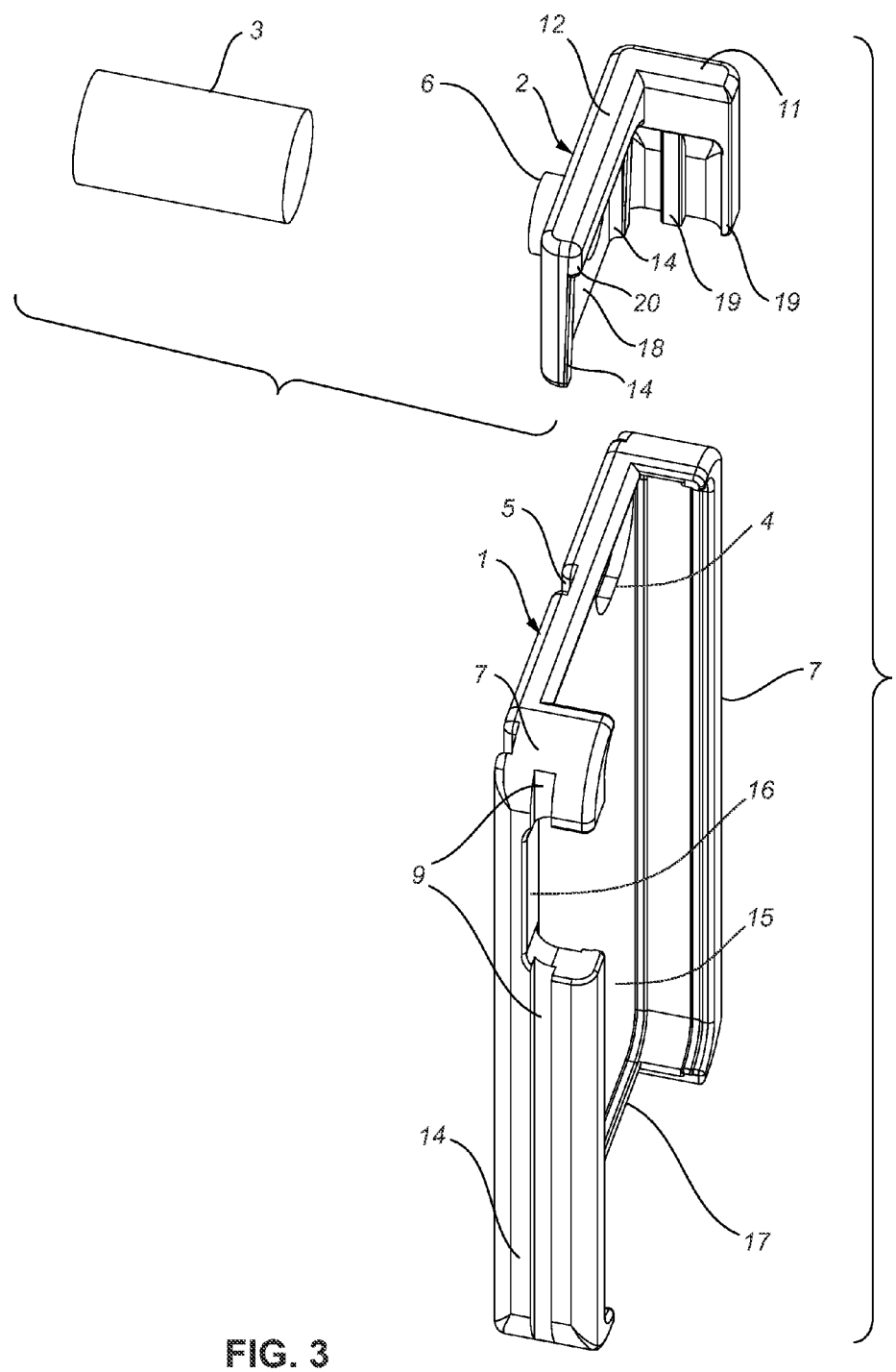
FIG. 3 is a side perspective view of a first embodiment of an assembly for coupling an external optical component to a portable electronic device.

FIGS. 1-3 depict various views of a non-limiting embodiment of an assembly for coupling an external optical component to a portable electronic device. FIG. 1 depicts a front perspective view of a portable electronic device case 1, an optical component coupling 2, and an optical component 3. FIG. 2 depicts a rear perspective view of a portable electronic device case 1, an optical component coupling 2, and an optical component 3. FIG. 3 depicts a side perspective view of a portable electronic device case 1, an optical component coupling 2, and an optical component 3.

In one or more embodiments of assembly for coupling an external optical component 3 to a portable electronic device, the portable electronic device case 1 comprises a rear wall 8 comprising an inner surface 15 and an outer surface 10. The portable electronic device case 1 further comprises two opposing sidewalls 7 coupled to the rear wall 8. The two opposing sidewalls 7 are positioned on portable electronic device case 1 to hold the portable electronic device between the two opposing sidewalls 7. When a portable electronic device is coupled to the portable electronic device case 1, the rear surface of the portable electronic device is typically positioned adjacent the inner surface 15 of the rear wall 8.

The rear wall 8 further comprises a camera opening 4 extending through the rear wall 8 and positioned to align with the camera and/or flash component of the portable electronic device when the portable electronic device case 1 is coupled thereto. Accordingly, the rear wall 1 does not cover the camera and/or flash component of the portable electronic device when the portable electronic device 1 is coupled to the portable electronic device. As depicted in the non-limiting figures of FIGS. 2 and 3, the portable electronic device case 1 may further comprise a cord port slot 17, a volume button slot 16, and a top slot opposite the cord port slot 17. In one or more embodiments, the sidewalls 7 of the portable electronic device case 1 may at least partially extend over the top and/or bottom of the portable electronic device case 1 to prevent the portable electronic device from sliding out of the portable electronic device case 1.

One or more embodiments of a portable electronic device case 1 further comprise at least one rear groove 5 on the outer surface 10 of the rear wall and at least one side groove 9 on an outer surface 14 of at least one sidewall 7 of the two opposing sidewalls 7. In the particular non-limiting embodiment depicted in FIGS. 1-3, the portable electronic device case 1 comprises three rear grooves 5 on the rear wall 8 and one side groove 9 on the side wall 7 nearest the camera opening 4. Although not required in all embodiments, the camera opening 4 may be positioned between two rear grooves 5.

The one or more rear grooves 5 of the portable electronic device case 1 are sized to allow the one or more rear tongues 14 (shown in FIGS. 2 and 3) of the optical component coupling 2 to slide within the one or more rear grooves 5 when removably coupling the optical component coupling 2 to the portable electronic device case 1. The one or more rear grooves 5 are likewise sized to engage with the one or more rear tongues 14 when the optical component coupling 2 is coupled to the portable electronic device case 1 and, in combination with the engagement of the side groove 9 and side tongue 19, prevent the optical component coupling 2 from uncoupling from the portable electronic device case 1.

The one or more side grooves 9 of the portable electronic device case 1 are sized to allow the one or more side tongues 19 (shown in FIG. 3) of the optical component coupling 2 to slide within the one or more side grooves 9 when removably coupling the optical component coupling 2 to the portable electronic device case 1. The one or more side grooves 9 are likewise sized to engage with the one or more side tongues 19 when the optical component coupling 2 is coupled to the portable electronic device case 1 and, in combination with the engagement of the rear grooves 5 and rear tongues 14, prevent the optical component coupling 2 from uncoupling from the portable electronic device case 1.

One or more embodiments of an optical component coupling 2 comprise a face plate 12 and a side plate 11 coupled to or integral with one another. The optical component coupling 2 is typically sized such that the face plate 12 is adjacent the outer surface 10 of the rear wall 8 of the portable electronic device case 1 and the side plate 11 is adjacent the outer surface 14 of the sidewall 7 of the portable electronic device case 1 when the optical component coupling 2 is coupled to the portable electronic device case 1.

As briefly noted above, the optical component coupling 2 typically comprises one or more rear tongues 14 and one or more side tongues 19. The one or more rear tongues 14 are positioned on an inner surface 18 of the face plate 12 to align with and slidably couple to one or more rear grooves 5 of the portable electronic device case 1. The one or more rear tongues 14 are sized to fit within the one or more rear grooves 5 of the portable electronic device case 1. In the particular non-limiting embodiment depicted in FIGS. 1-3, the optical component coupling 2 comprises two rear tongues 14 positioned to align and engage with the two rear grooves 5 adjacent the camera opening 4. In other embodiments, only a single rear tongue 14 is required.

The optical component coupling 2 typically comprises one or more side tongues 19. The one or more side tongues 19 are positioned on an inner surface of the side plate 11 to align with and slidably couple to one or more side grooves 9 of the portable electronic device case 1. The one or more side tongues 19 are sized to fit within the one or more side grooves 9 of the portable electronic device case 1. In the particular non-limiting embodiment depicted in FIGS. 1-3, the optical component coupling 2 comprises two side tongues 19. A first of the two side tongues 19 is positioned to engage with the one side groove 19, and a second of the two side tongues 19 is positioned to engage with the side wall 7 opposite the rear wall 8. In other embodiments, only a single side tongue 9 is required.

One or more embodiments of an optical component coupling 2 comprise a shoulder 20. The shoulder 20 is typically positioned on the inner surfaces of the optical component 2 to abut the top of the portable electronic device case 1 when the optical component coupling 2 is coupled to the portable electronic device case 1 and the optical component opening 100 is aligned with the camera opening 4. In abutting the top of the rear wall 8 and/or sidewall 7, the shoulder 20 prevents the optical component opening 100 and the optical component 3 from sliding past the camera opening 4. Thus, the shoulder 20 assisting in the proper alignment of the optical component 3 with the camera of the portable electronic device.

As just referenced, embodiments of the optical component coupling 2 typically comprise an optical component opening 100. The optical component opening 100 is positioned to align with the camera opening 4 when the optical component coupling 2 is removably coupled to the portable electronic device case 1. The optical component opening 100 is likewise positioned to align with the camera of the portable electronic device when the optical component coupling 2 and the portable electronic device are removably coupled to the portable electronic device case 1. In one or more embodiments, the optical component coupling 2 further comprises an optical component coupling mount 6 protruding from an outer surface 13 of the face plate 12. The optical component opening 100 typically extends through the optical coupling mount 6. The optical coupling mount 6 is configured to securely mount or couple the optical component 3 to the optical component coupling 2.

The optical component 3 may comprise any of optical components previously referenced. In some embodiments, the optical component 3 is removably coupled to the optical component mount 6 of the optical component coupling 2, thus allowing for interchanging of the various type of optical components to the optical component coupling 2. In other embodiments, the optical component 3 is fixedly coupled to the optical component coupling 2 and/or the optical component mount 6. Coupling of the optical component 3 to the optical component coupling 2 may be accomplished the any of a number of mechanisms known in the art, such as but not limited to adhesives, friction, threaded coupling, snap fits, and the like.

In operation of coupling the optical component coupling 2 with the portable electronic device case 1 of an assembly for coupling an external optical component 3 to a portable electronic device, one or more rear tongues 14 are aligned with one or more rear grooves 5 and one or more side tongues 19 are aligned with one or more side grooves 9. The optical component coupling 2 is then slid onto the portable electronic device case 1 until the shoulder 20 abuts the portable electronic device case 1, the one or more rear tongues 14 being engaged with the one or more rear grooves 5 and the one or more side tongues 19 being engaged with the one or more side grooves 9. When the shoulder 20 abuts the portable electronic device case 1, the optical component opening 100, and optical component 3 if present, are aligned with the camera opening 4 of the portable electronic device case 1.

Figure 26:
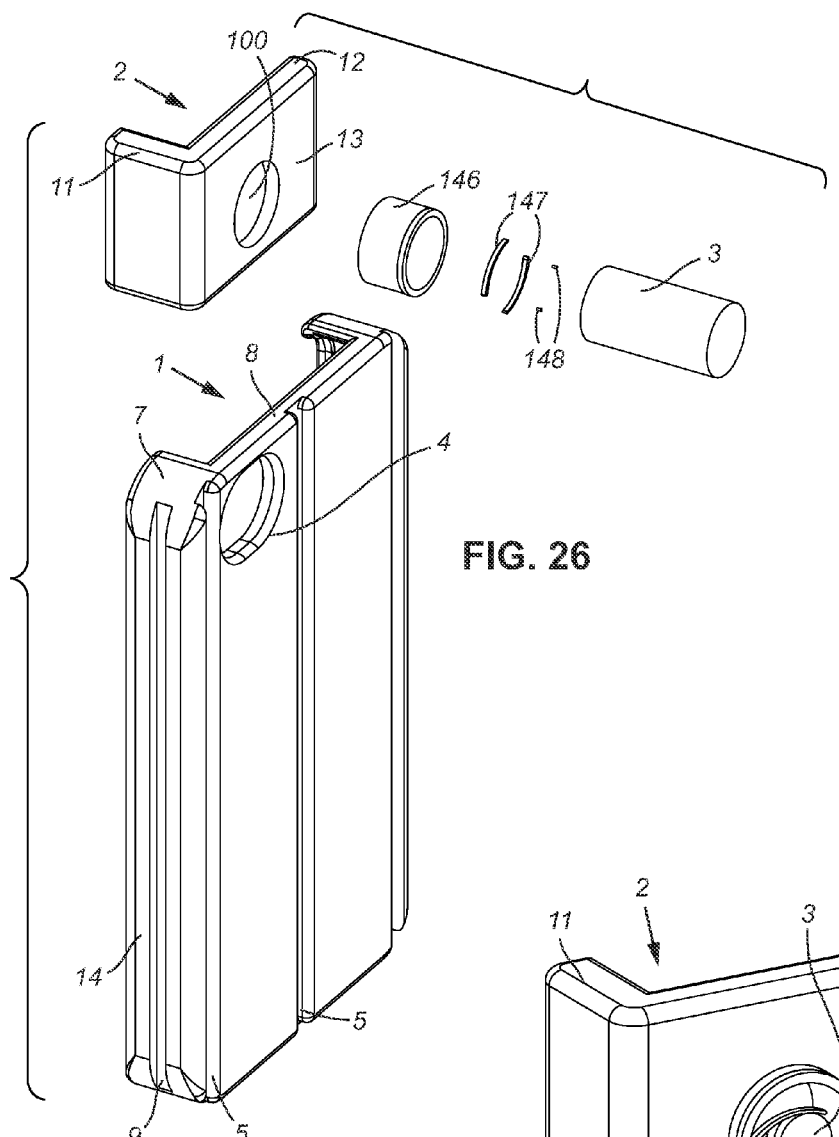
FIG. 26 is a front perspective view of a first embodiment of an assembly for coupling an external optical component to a portable electronic device, with an exploded view of an embodiment of an optical component mount.
Figure 27:
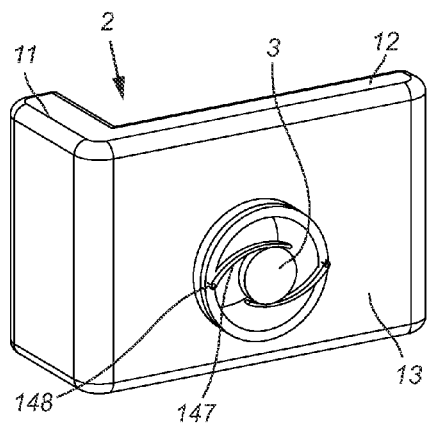
FIG. 27 is a front perspective view of an optical component coupling having and adjustable optical component mount and calipers coupled thereto.

FIGS. 26 and 27 depict a more detailed view of a non-limiting example of an optical component coupling 2. FIG. 26 depicts the optical component coupling 2 separated from the portable electronic device case 1, while FIG. 27 depicts a front perspective view of a non-limiting embodiment of a optical component coupling 2. In one or more embodiments, the optical component coupling mount comprises and adjustable optical component coupling mount 146. According to one aspect, the adjustable optical component coupling mount 146 is threaded and configured to threaded couple to the face plate 12 of the optical component coupling 2. Threaded coupling or engagement allows the focal length of the external optical component 3 to be adjusted by drawing the external optical component 3 closer to or further from the face plate 12 and the camera of the portable electronic device removably coupled to the portable electronic device case 1.

One or more embodiments of an optical component coupling 2 further comprise calipers 147. The calipers 147 may comprise any calipers known in the art configured to hold an external optical component 3. More particularly, the caliper 147 are configured to couple external optical components 3 of varying diameters or sizes to the optical component coupling 2. Pins 148 are also include in one or more embodiments to pivotally couple the calipers 147 to the adjustable optical component coupling mount 146. It is also contemplated that the adjustable optical component coupling mount 146, calipers 147, and pins 148 may likewise be included with any of the optical component couplings disclosed and described herein.

Figure 4:
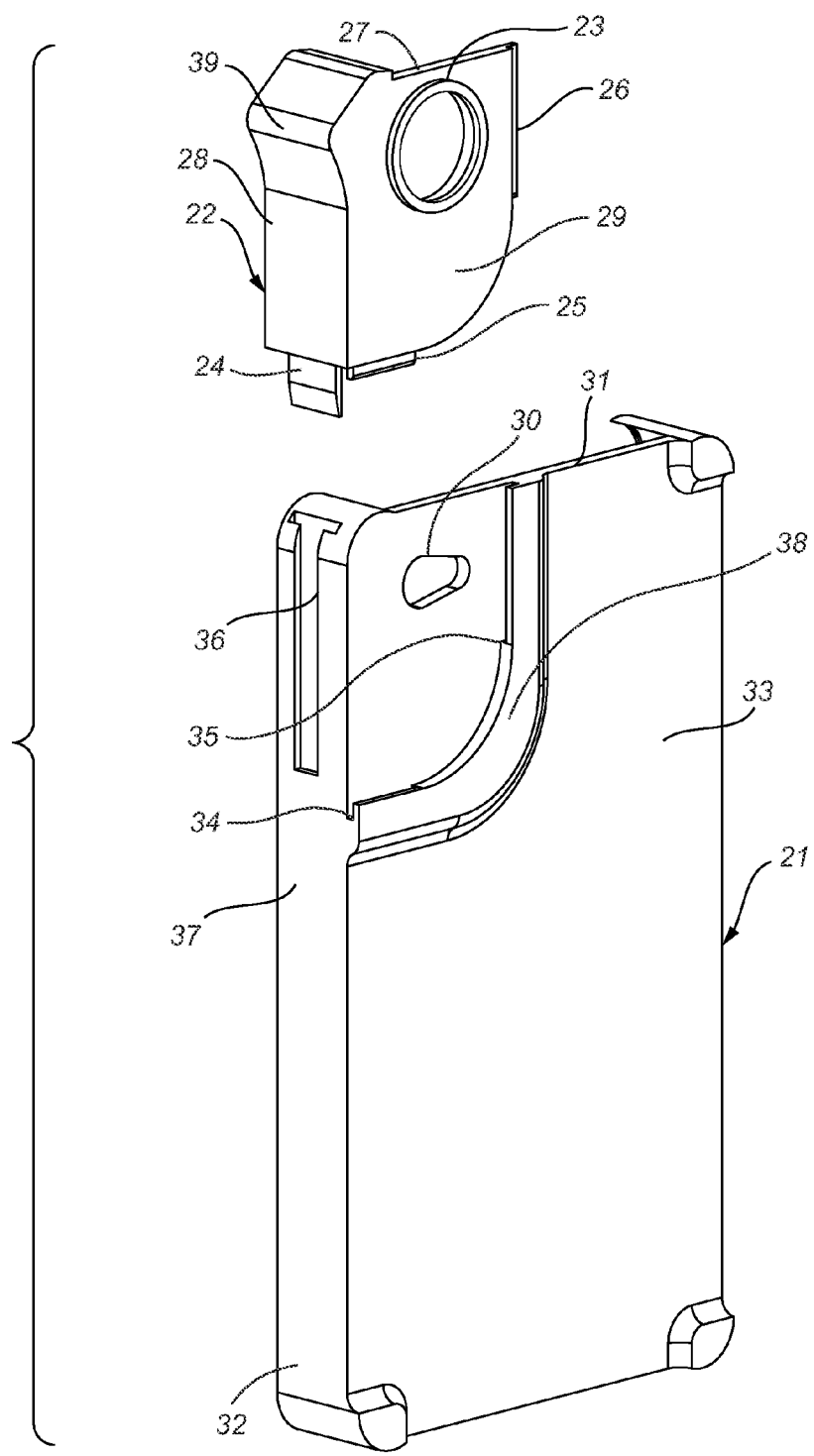
FIG. 4 is a front perspective view of a second embodiment of an assembly for coupling an external optical component to a portable electronic device.

FIGS. 4-7 depict various views of another non-limiting embodiment of an assembly for coupling an external optical component 3 to a portable electronic device. FIG. 4 depicts a front perspective view and FIG. 7 depicts a rear perspective view of an assembly for coupling an external optical component 3 to a portable electronic device. FIGS. 5 and 6 depict front and rear perspective views, respectively, of the optical component coupling 22 of this particular non-limiting embodiment.

One or more embodiments of an assembly for coupling an external optical component 3 to a portable electronic device comprise a portable electronic device case 21 and an optical component coupling 22. Unless otherwise specified, the portable electronic device case 21 and the optical component coupling 22 may comprise features similar or identical to features of other portable electronic device cases and optical component couplings described and contemplated herein without departing from the scope of this disclosure.

One or more embodiments of a portable electronic device case 21 comprise a rear wall 31, two opposing sidewalls 32, and a camera opening 30. The rear wall 31 comprises an inner surface 42 and an outer surface 33. Positioning of the rear wall 31, sidewalls 32, and camera opening 30 relative to a portable electronic device is similar to that previously described. The portable electronic device case 21 may further comprise a cord port slot 41 and a volume button slot 40.

In the non-limiting embodiment depicted in FIGS. 4-7, the portable electronic device case 21 comprises one or more grooves. The one or more rear grooves of this embodiment, however, are formed between an outer surface 33 of the rear wall 31 and a protrusion 38 (shown in FIG. 4) extending outward form the outer surface 33 of the rear wall. The protrusion 38 is continuous and intersects with a top portion of the rear wall 31 and a side portion of the rear wall 31 adjacent a sidewall 32. In other embodiments, the protrusion 38 may comprise a plurality of separate protrusions extending from the outer surface 33 of the rear wall. The protrusion 38 may be positioned so as not to insect the top portion of the rear wall 31 or the side portion of the rear wall 31. In still other embodiment embodiments, the one or more grooves are formed between a recess portion of the rear wall 31 and the outer surface 33 of the rear wall 31 rather than a protrusion 38.

The particular embodiment depicted in FIG. 4 comprises a substantially horizontal rear groove 34 and a substantially vertical rear groove 35. In other embodiments, the portable electronic device case 21 may comprise only one of the substantially horizontal rear groove 34 and the substantially vertical rear groove 35. The substantially horizontal rear groove 25 is positioned to engage with a first tongue 25 on the optical component coupling 22 when the optical component coupling 22 is coupled to the portable electronic device case 21, and the substantially vertical rear groove 35 is positioned to engage with a second tongue 26 on the optical component coupling 22 when the optical component coupling 22 is coupled to the portable electronic device case 21. The rear grooves of the portable electronic device case 21 are sized to allow the respective tongue to slide within the rear groove when coupling the optical component coupling 22 to the portable electronic device case 21.

Although not required in all embodiments, one or more embodiments of a portable electronic device case 21 comprise a T-shaped side groove 36 (shown in FIG. 4) on the outer surface 37 of the sidewall 32 nearest the camera opening 30. Alternatively, one or more embodiments of a portable electronic device case 21 may comprise the T-shaped side groove 36 on the outer surface 37 of the sidewall 32 without the rear grooves of the rear wall 31. Still other embodiments may comprise a side groove similar to any of the side grooves disclosed elsewhere in this document.

The T-shaped side groove 36 is typically sized complementary to a T-shaped tongue 24 on the optical component coupling 22. As such, the T-shaped side groove is shaped and sized to allow the T-shaped side tongue 24 to slide and engage within the T-shaped side groove 36.

One or more embodiments of an assembly for coupling an external optical component 3 to a portable electronic device further comprises an optical component coupling 22 configured to removably couple to a portable electronic device case 21. FIGS. 4-7 depict a non-limiting embodiment of an optical component coupling 22 configured to couple to a portable electronic device case 21. Unless otherwise specified, the optical component coupling 22 may comprise features similar to other optical component couplings described elsewhere in this document. For example, the optical component coupling 22 comprises an optical component opening 100 and a optical component mount 23 sized and positioned to those previously described. Alternatively, the optical component mount 23 shown in FIGS. 4-7 may include the optical component 3 already mounted therein.

One or more embodiments of an optical component coupling 22 comprise a face plate 27, a side plate 28, and a shoulder 44. The optical component coupling 22 may further comprise a gripping element 39 extending from the outer surface of the side plate 28. The shoulder 44 of this particular embodiment is positioned primarily adjacent the side plate 28 and is positioned to abut a portion of the side wall 32 when the optical component opening 100 is aligned with the camera opening 30 when coupling the optical component coupling 22 to the portable electronic device case 21. In other embodiments, the shoulder 44 is not required, as the substantially horizontal rear groove 34 and/or the T-shaped side groove are configured and positioned to hold the optical component coupling 22 in place to align the optical component opening 100 and the camera opening 30.

As previously noted, the optical component coupling 22 may comprise one or more rear tongues positioned to engage with one or more rear grooves on the outer surface 33 of the rear wall 31. In the particular embodiment depicted, the optical component coupling comprises a first rear tongue 25 positioned to engage with a substantially horizontal rear groove 34 and a second rear tongue 26 positioned to engage with a substantially vertical rear groove 35. In other embodiments, only one of the two rear tongues is present.

In addition or alternative to the rear tongues, one or more embodiments of an optical component coupling 22 further comprise a T-shaped side tongue 24. The T-shaped side tongue 24 is sized to slidably couple to and engage with the T-shaped side groove 36 of the portable electronic device case 21. Engagement of the T-shaped side groove 36 and the T-shaped side tongue 24 assist in securing the optical component coupling 22 to the portable electronic device case 21, with or without the presence of the rear grooves and rear tongues according to various embodiments.

Figure 8:
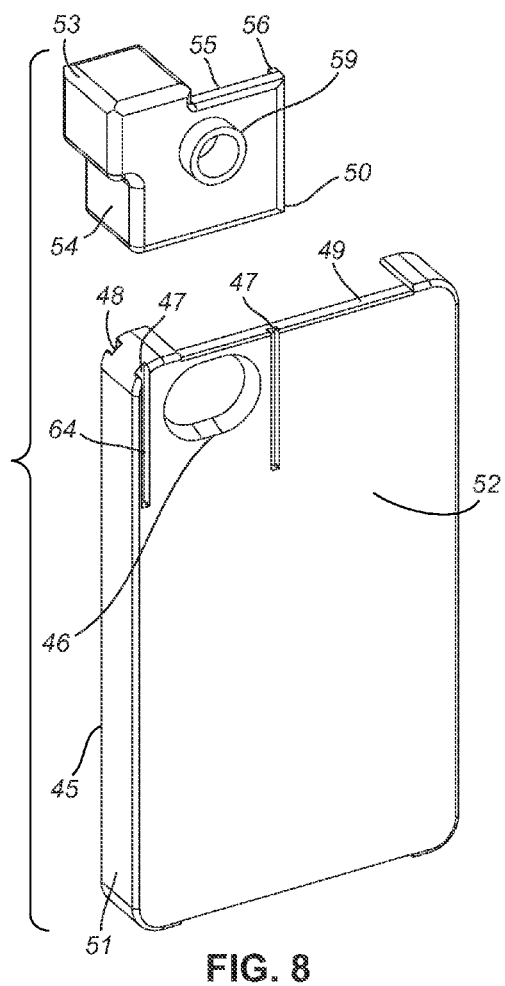
FIG. 8 is a front perspective view of a third embodiment of an assembly for coupling an external optical component to a portable electronic device.
Figure 9:
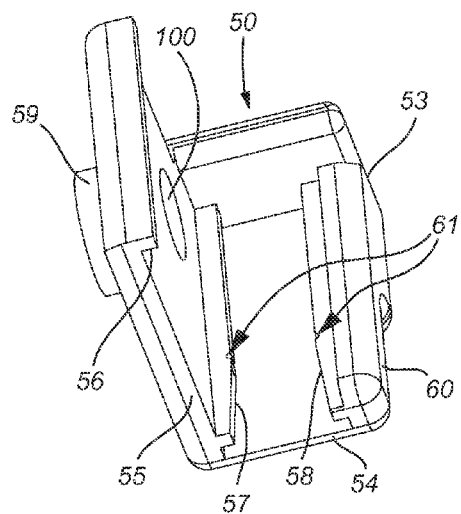
FIG. 9 is a bottom rear perspective view of a third embodiment of an optical component coupling.
Figure 10:
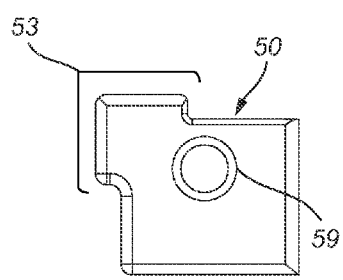
FIG. 10 is a front view of a third embodiment of an optical component coupling.
Figure 11:
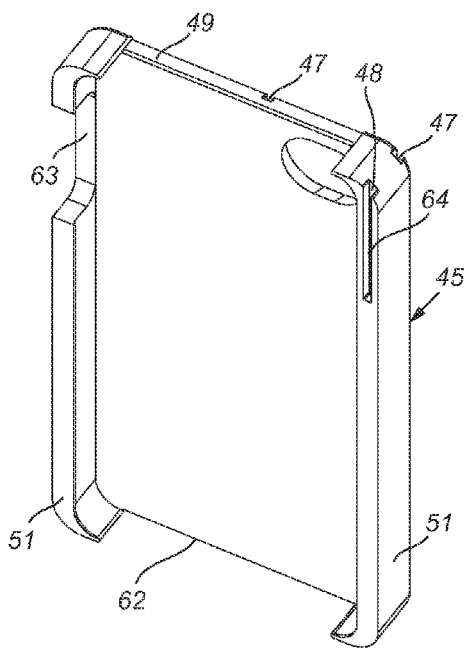
FIG. 11 is a rear perspective view of a third embodiment of a portable electronic device case.

FIGS. 8-11 depict various views of another non-limiting embodiment of an assembly for coupling an external optical component 3 to a portable electronic device. FIG. 8 depicts a front perspective view of an assembly for coupling an external optical component 3 to a portable electronic device. FIGS. 9 and 10 depict a bottom perspective and front view, respectively, of a optic component coupling 50. FIG. 11 depicts a rear perspective view of a portable electronic device case 45.

One or more embodiments of an assembly for coupling an external optical component 3 to a portable electronic device comprise a portable electronic device case 45 and an optical component coupling 50. Unless otherwise specified, the portable electronic device case 45 and the optical component coupling 50 may comprise features similar or identical to features of other portable electronic device cases and optical component couplings described and contemplated herein without departing from the scope of this disclosure.

One or more embodiments of a portable electronic device case 45 comprise a rear wall 49, two opposing sidewalls 51, and a camera opening 46. The rear wall 49 comprises an inner surface and an outer surface 52. Positioning of the rear wall 49, sidewalls 51, and camera opening 46 relative to a portable electronic device is similar to that previously described. The portable electronic device case 45 may further comprise a cord port slot 62 and a volume button slot 63.

In the non-limiting embodiment depicted in FIGS. 8 and 11, the portable electronic device case 45 comprises one or more rear grooves 47. The one or more rear grooves 47 may be configured similar to any of the rear grooves described elsewhere in this document. In one or more embodiments, the portable electronic device case 45 comprises two rear grooves 52 on the outer surface 52 of the rear wall 49, the camera opening 46 being positioned between the two rear grooves 47. In this particular embodiment, the rear grooves 47 extend less than halfway between the top and the bottom of the rear wall 49. More particularly, the rear grooves 47 extend less than 1/3 of the distance from the top to the bottom of the rear wall 49.

The rear grooves 47 are sized and positioned to align and engage with one or more rear tongues on the optical component coupling 50.

One or more embodiments of a portable electronic device case 45 further comprise a rib 64 positioned within at least one of the one or more rear grooves 47. The rib 64 is positioned within at least one of the one or more rear grooves 47 to engage with a depression 61 on one or more of the rear tongues of the optical component coupling 50. Engagement between the groove 47 and the depression 61 assists in securing the optical component coupling 50 to the portable electronic device case 45 with the optical component opening 100 aligned with the camera opening 46 and the camera of the portable electronic device. In the particular non-limiting embodiment depicted in FIG. 8, the portable electronic device case 45 comprise a rib 64 in a first rear groove 47 nearest the sidewall 51 having a side groove 48. The rib 64 is positioned within the groove 47 to engage with a depression 61 on a first rear tongue 57 on the optical component coupling 50. A second rear groove 47 of this particular embodiment does not include a rib 64, the second rear groove configured to engage with a second rear tongue 56 on the optical component coupling 50 that does not include a depression 61. In other embodiments, all rear grooves 47 may comprise a rib 64 and all rear tongues 56, 57 may comprise a depression 61.

One or more embodiments of a portable electronic device case 45 further comprise one or more side grooves 48. The one or more side grooves 48 may be positioned as described elsewhere in this document or, alternatively may be positioned on a portion of the sidewall 51 opposite a rear groove 47. In such a configuration, a portion of the sidewall 51 comprises a T-shaped configuration that includes a rear groove 47 and a side groove 48. In this particular embodiment, the side groove 48 extends less than halfway between the top and the bottom of the sidewall 51. More particularly, the side groove 48 extends less than 1/3 of the distance from the top to the bottom of the sidewall 51. The side groove 48 is sized and positioned to align and engage with a side tongue 58 on the optical component coupling 50. In one or more embodiments, the side groove 48 further comprises one or more ribs 64 similar to the ribs 64 previously described herein. In such embodiments, the side tongue 58 comprises a depression 61 similar to the depressions 61 previously described herein.

One or more embodiments of an assembly for coupling an external optical component 3 to a portable electronic device comprise an optical component coupling 50 configured to removably couple to a portable electronic device case 45. Embodiments of an optical component coupling 50 may comprise features similar to those previously described in relation to other embodiments of optical component couplings, such as but not limited to a optical component opening 100 and a optical component mount 59 on the face plate 55 of the optical component coupling 50.

Like other embodiments, the optical component coupling 50 comprises a face plate 55 and a side plate 54. As previously noted, one or more embodiments of the optical component coupling 50 comprise one or more rear tongues. The rear tongues extend from an inner surface of the face plate 55 and are sized and positioned to slidably couple to and engage with one or more rear grooves 47 on the rear wall 52. In the particular embodiment depicted in FIG. 9, the optical component coupling comprises a first rear tongue 57 having a depression 61 and a second rear tongue 56 having no depression. In other embodiments, neither or both of the rear tongues may comprise a depression 61. The depression is positioned and sized to engage with a rib 64 within the rear groove when the optical component coupling 50 is coupled to the portable electronic device case 45.

One or more embodiments of an optical component coupling 50 further comprise a side tongue 58 extending from a front plate 60 of the optical component coupling 50. The front plate 60 is typically coupled to and/or extending from the side plate 54 opposite the face plate 55. The side tongue 58 may further comprise a depression 61 similar to those previously described and positioned to engage with a rib 64 in the side groove 48. As shown in FIG. 9, the side tongue 58 is on the same plane as a first rear tongue 57, the side tongue 58 and rear tongue 57 forming a T-shaped groove on the optical component coupling 50 that slidably couples to the T-shaped sidewall of the portable electronic device case 45 previously described.

One or more embodiments of an optical component coupling 50 further comprise a gripping element 53. The gripping element 53 extends outward from the side plate 54 and inward from the face plate 55. In particular embodiments, the gripping element 53 acts as a shoulder similar to the shoulders described elsewhere in this document.

Figure 12:
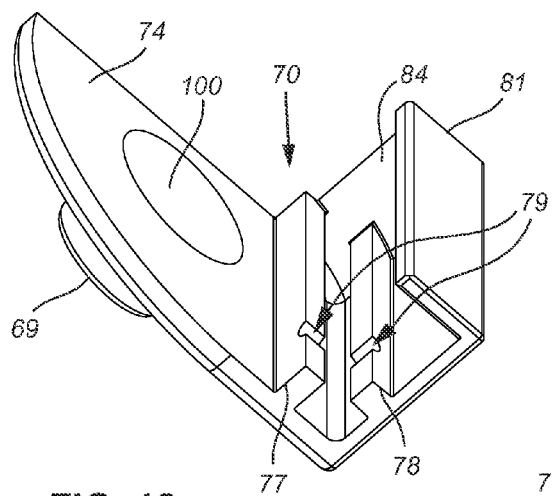
FIG. 12 is a bottom rear perspective view of a fourth embodiment of an optical component coupling.
Figure 13:
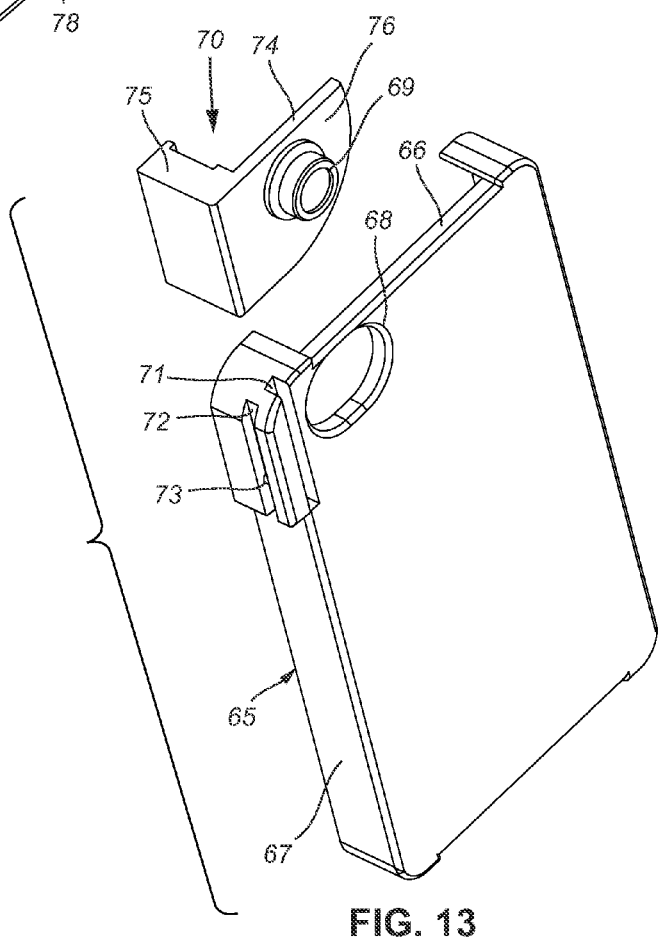
FIG. 13 is a perspective view of a fourth embodiment of an assembly for coupling an external optical component to a portable electronic device.

One or more embodiments of an assembly for coupling an external optical component 3 to a portable electronic device comprise a portable electronic device case 65 and an optical component coupling 70. Unless otherwise specified, the portable electronic device case 65 and the optical component coupling 70 may comprise features similar or identical to features of other portable electronic device cases and optical component couplings described and contemplated herein without departing from the scope of this disclosure. FIG. 12 depicts a rear perspective view of a optical component coupling 70 and FIG. 13 depicts a front perspective view of an assembly for coupling an external optical component 3 to a portable electronic device, the assembly including a portable electronic device case 65 and an optical component coupling 70.

The portable electronic device case 65 comprises a rear wall 66, two opposing sidewalls 67, and a camera opening 68 positioned similar to those described elsewhere in this document. The portable electronic device case 65 further comprises one or more rear grooves 71 on the outer surface of the rear wall 66. In the particular embodiment depicted in FIG. 13, the portable electronic device case 65 comprises only one rear groove 71 positioned between the camera opening 68 and the sidewall 67 having a side groove 72. Other embodiments may comprise any of the rear groove configurations described in this document.

A portable electronic device case 65 typically further comprises one or more side grooves 72 on one of the sidewalls 66, typically the sidewall 66 nearest the camera opening 68. As depicted in FIG. 13, in one or more embodiments, the side groove 71 is positioned within a raised portion extending outward from the sidewall 66. In other embodiments, the side groove 72 is configured similar to any of the side groove described herein.

One or more embodiments of a portable electronic device case 65 further comprise a rib 73 positioned within at least one of the side groove 72 and/or the rear groove 71. The rib is positioned within the side groove 72 and/or the rear groove 71 to engage with a depression on a side tongue 78 and/or a rear tongue 77 on the optical component coupling 70 when the optical component coupling 70 is coupled to the portable electronic device case 65. In such an engagement, the optical component opening 100 and optical component mount 69 are aligned with the camera opening 68 and the camera of the portable electronic device (when coupled thereto). In the particular embodiment depicted in FIGS. 12 and 13, a rib 73 is positioned in both the side groove 72 and the rear groove 71, and a depression is posited on both the side tongue 78 and the rear tongue 77.

Embodiments of the optical component coupling 70 are configured to removably couple to the portable electronic device case 65. Similar to other optical component couplings described herein, the optical component coupling 70 comprises a face plate 74 and a side plate 75. The rear tongue 77 described above typically extends inward from the inner surface of the face plate 74, and the side tongue 78 described above typically extends inward from the inner surface of the side plate 75.

One or more embodiments of an optical component coupling 70 further comprise at least one of a shoulder 84 and a front plate 81. The front plate 81 typically extends from the side plate 75 opposite the face plate 74. The shoulder 84 typically extends between the front plate 81 and the face plate 74 and is shaped to abut the raised portion of the sidewall 66 when the optical component coupling 70 is coupled to the portable electronic device case 65 with the optical component opening 100 aligned with the camera opening 68.

Figures 14, 15:
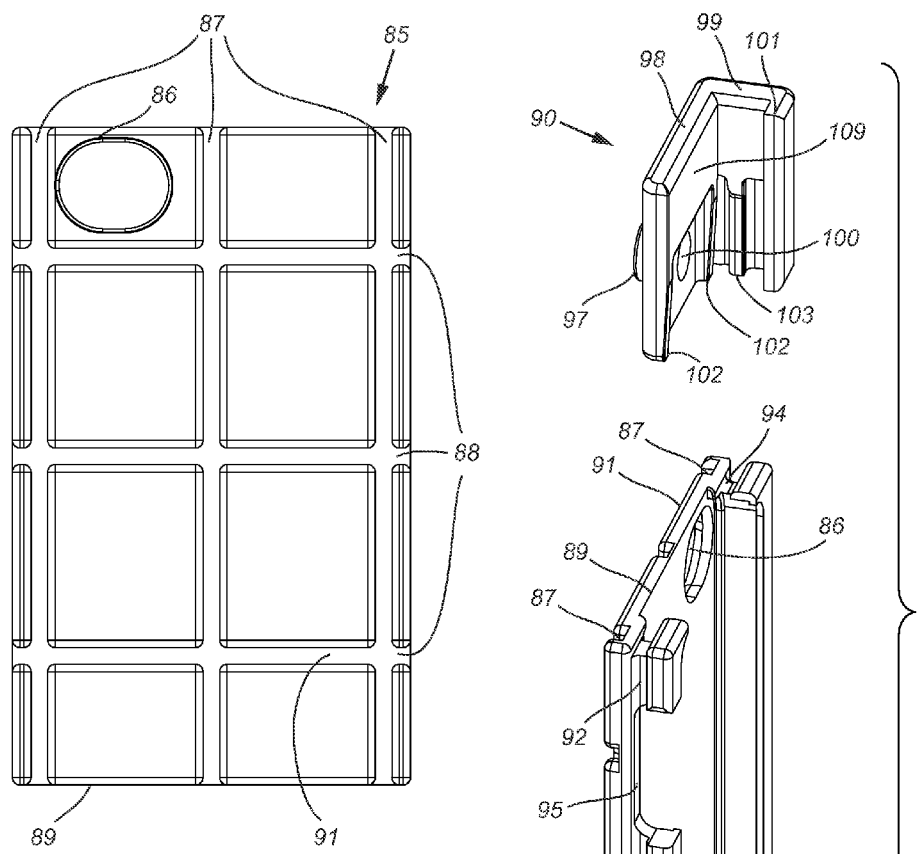
FIG. 14 is a front view of a fifth embodiment of a portable electronic device case.
FIG. 15 is a side perspective view of a fifth embodiment of an assembly for coupling an external optical component to a portable electronic device.
Figure 16:
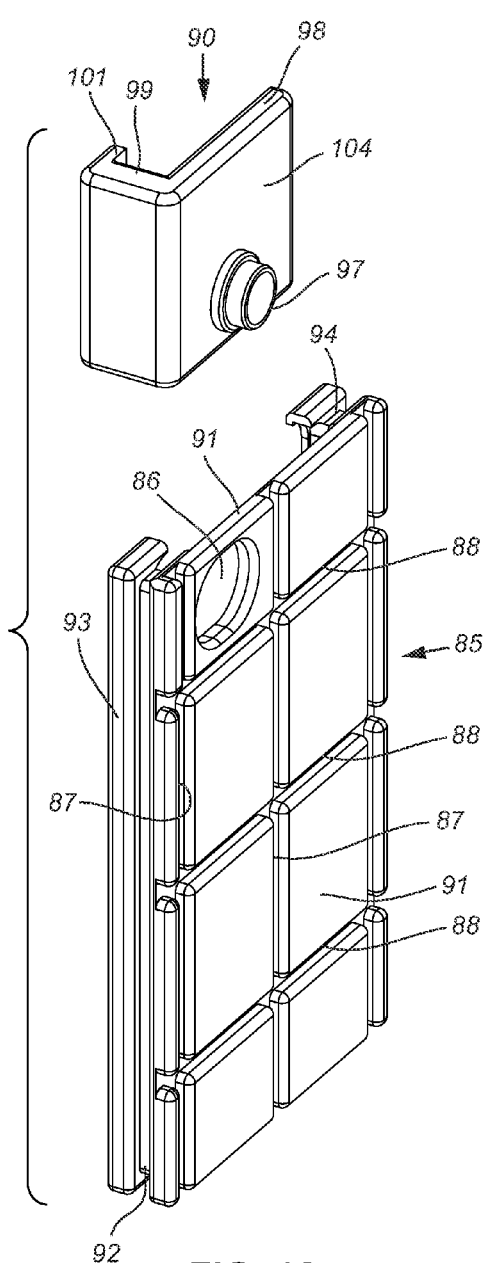
FIG. 16 is a front perspective view of a fifth embodiment of an assembly for coupling an external optical component to a portable electronic device.

One or more embodiments of an assembly for coupling an external optical component 3 to a portable electronic device comprise a portable electronic device case 85 and an optical component coupling 90. Unless otherwise specified, the portable electronic device case 85 and the optical component coupling 90 may comprise features similar or identical to features of other portable electronic device cases and optical component couplings described and contemplated herein without departing from the scope of this disclosure. FIG. 14 depicts a front view of a portable electronic device case 85. FIG. 15 depicts a side perspective view and FIG. 16 depicts a front perspective view of an assembly for coupling an external optical component 3 to a portable electronic device, the assembly including a portable electronic device case 85 and an optical component coupling 90.

The portable electronic device case 85 comprises a rear wall 89, two opposing sidewalls 93, and a camera opening 86 positioned similar to those described elsewhere in this document. The portable electronic device case 85 further comprises one or more primary rear grooves 81 on the outer surface 91 of the rear wall 89. In the particular embodiment depicted in FIG. 14, the portable electronic device case 85 comprises three primary rear grooves 87, with the camera opening 68 being positioned between two of the three primary rear grooves 87. The one or more primary rear grooves 87 are sized and positioned to engage with one or more rear tongues 102 of the optical component coupling 90 when the optical component coupling 90 is removably coupled to the portable electronic device case 85, similar to those previously described herein.

One or more embodiments of a portable electronic device case 85 further comprise one or more secondary rear grooves 88. The one or more secondary rear grooves 88 are typically positioned on the outer surface 91 or the rear wall 89 substantially perpendicular to the one or more primary rear grooves 87. As shown in FIG. 15, one or more embodiments of a portable electronic device case 85 further comprise at least one of a cord port slot 96, a volume button slot 95, and a top slot similar to those previously described herein.

According to various aspects, at least one of the sidewalls 93 of a portable electronic device case 85 comprise one or more side grooves 92. In the particular embodiment depicted in FIGS. 15 and 16, the portable electronic device case 85 comprises one side groove 92 on each sidewall 93. The side groove 92 on the sidewall 93 nearest the camera opening 86 is sized to engage with the side tongue 103 of the optical component coupling 90 when the optical component coupling 90 is removably coupled to the portable electronic device case 85, similar to those previously described herein.

Embodiments of an optical component coupling 90 are configured to removably couple to a portable electronic device case 85. Similar to other optical component couplings described elsewhere in this document, embodiments of an optical component coupling 90 typically comprise a face plate 98, a side plate 99, a front plate 101, a optical component mount 97 extending from an outer surface 104 of the face plate 98, and an optical component opening 100 extending through the face plate 98.

As noted above, embodiments of an optical component coupling 90 further comprise at least one of one or more rear tongues 102 and a side tongue 103. The side tongue 103 typically extends inward from an inner surface of the side plate 99, and the one or more rear tongues 102 typically extend inward from an inner surface of the face plate 98. In various embodiments, the rear tongues 102 and/or the side tongue 103 taper from the shoulder 109 toward the bottom of the optical component coupling 90. The shoulder 109 is positioned on the optical component coupling 90 to abut or interface with the portable electronic device case 85 when the optical component opening 100 is aligned with the camera opening 86, similar to the shoulders of other embodiments described herein.

Figure 17:
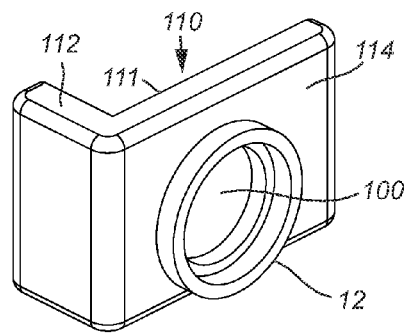
FIG. 17 is a front perspective view of a sixth embodiment of an optical component coupling.
Figure 18:
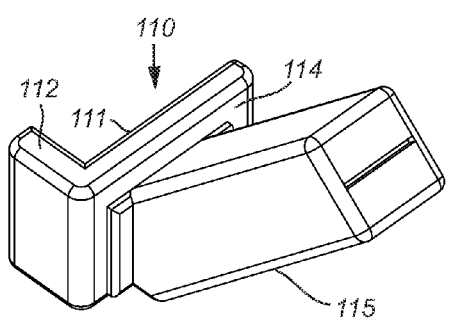
FIG. 18 is a top perspective view of a sixth embodiment of an optical component coupling coupled to an optical component.
Figure 19:
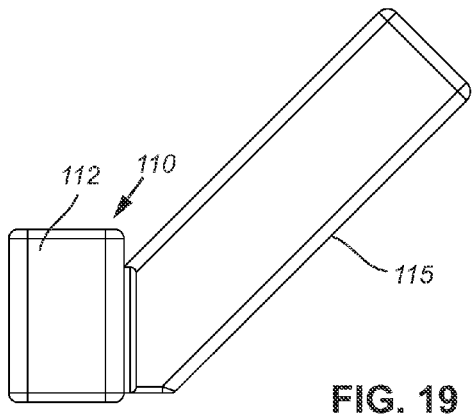
FIG. 19 is a side view of a sixth embodiment of an optical component coupling coupled to an optical component.

FIGS. 17-19 depict another embodiment of an optical component coupling 115. Although not shown in FIGS. 17-19, the optical component coupling 115 may be adapted to couple to any of the portable electronic device cases described herein and may comprise any of the rear tongues and side tongues described herein. The particular non-limiting embodiment of an optical component 110 shown in FIGS. 17-19 comprises a face plate 111, a side plate 112, and optical component mount 113 extending from the outer surface 114 of the face plate 111, and an optical component opening 100.

FIGS. 18 and 19 depict a perspective view and a side view, respectively, of a spectrometer 115 coupled to the optical component mount 113 of the optical component coupling 110. Other optical components previously described herein may be similarly coupled to the optical component mount 113.

FIGS. 20-22 depict various views of another embodiment of a portable electronic device case 120 and optical component coupling 130. FIG. 20 depicts a front perspective view of a portable electronic device case 120 and optical component coupling 130, FIG. 21 depicts a rear perspective view of an optical component coupling 130, and FIG. 22 depicts a top view of a portable electronic device case 120. Similar to other portable electronic device cases described herein, the portable electronic device case 120 comprises a rear wall 122, two opposing sidewalls 124, and a camera opening 121. The portable electronic device case 120 further comprises a side tongue 124 extending from each sidewall 123.

The portable electronic device case 120 is configured to removably couple to an optical component coupling 130. The optical component coupling 130 comprises a face plate 132 and at least one side plate 131. The optical component coupling 130 further comprises an optical component opening 100 and an optical component mount 6 similar to those previously described and shown in herein. Additionally, the optical component coupling 130 further comprises a shoulder 135 similar to any of the shoulders previously describe herein or a top plate that abuts the portable electronic device case 120 when the optical component opening 130 is aligned with the camera opening 121. In one or more embodiments, the optical component coupling 130 further comprises at least one side groove 134 on an inner surface of each side plate 131. Each side groove 134 is sized and positioned to slidably couple to and engage with a side tongue 124 of one of the sidewalls 123.

FIGS. 23-25 depict various views of another embodiment of a portable electronic device case 125 and optical component coupling 140. FIG. 23 depicts a front perspective view of a portable electronic device case 125 and optical component coupling 140, FIG. 24 depicts a rear perspective view of an optical component coupling 140, and FIG. 25 depicts a top view of a portable electronic device case 125. Similar to other portable electronic device cases described herein, the portable electronic device case 125 comprises a rear wall 127, two opposing sidewalls 128, and a camera opening 121. The portable electronic device case 120 further comprises side groove 129 extending from each sidewall 128. In one or more embodiments, the side groove comprises a T-shaped side groove.

The portable electronic device case 125 is configured to removably couple to an optical component coupling 140. The optical component coupling 140 comprises a face plate 141 and at least one side plate 131. The optical component coupling 140 further comprises an optical component opening 100 and an optical component mount 6 similar to those previously described and shown in herein. Additionally, the optical component coupling 140 further comprises a shoulder 145 similar to any of the shoulders previously describe herein or a top plate that abuts the portable electronic device case 125 when the optical component opening 100 is aligned with the camera opening 121. In one or more embodiments, the optical component coupling 140 further comprises a side tongue 144 on an inner surface of each side plate 141. Each side tongue 144 is sized and positioned to slidably couple to and engage with the side grooves 129 of the sidewalls 128. In one or more embodiments, the side grooves 129 comprise T-shaped side grooves 129, and the side tongue 144 comprises a T-shaped side tongue 144.

Figures 28, 29:
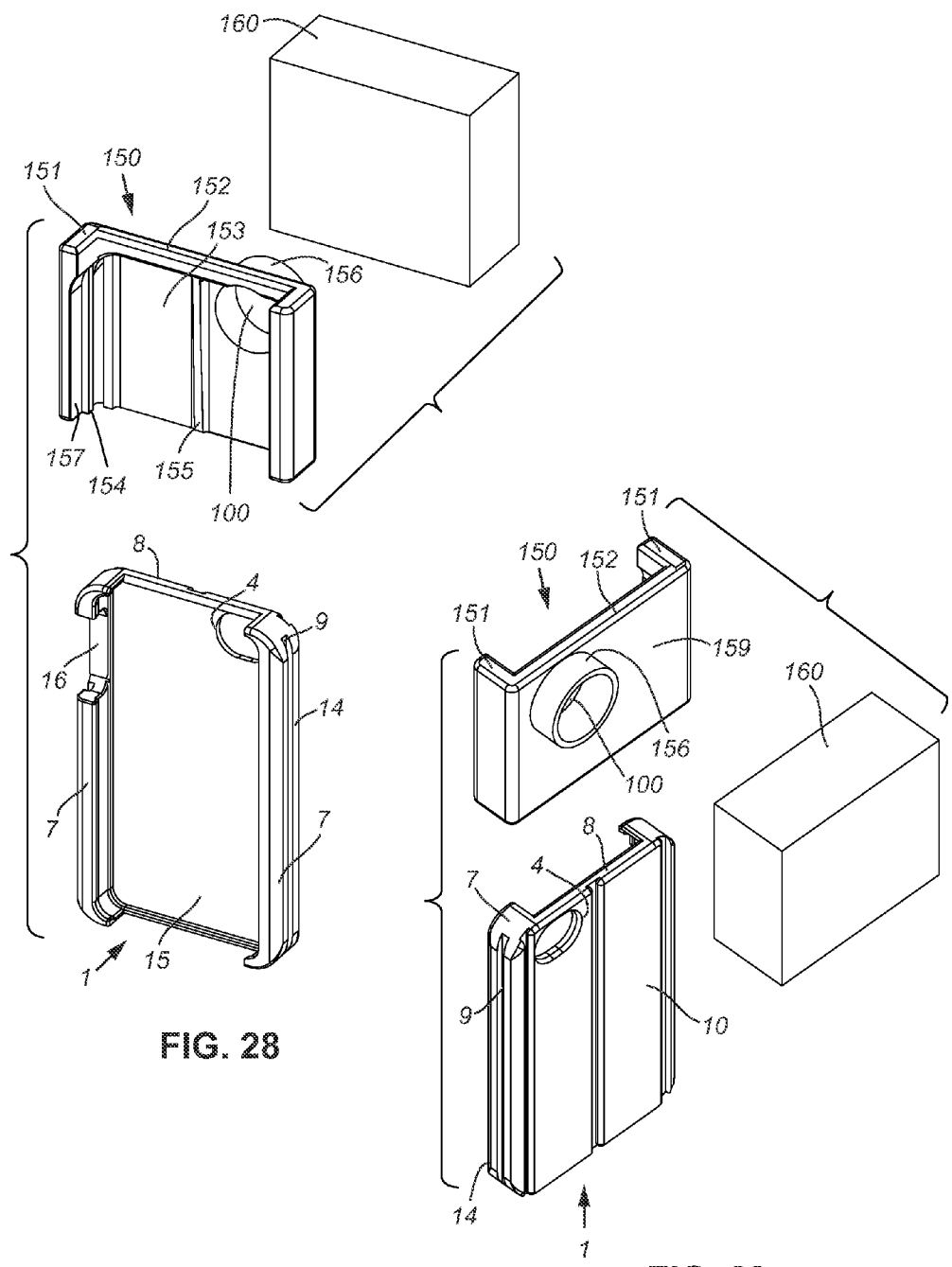
FIG. 28 is a rear perspective view of an eighth embodiment of an assembly for coupling an external optical component to a portable electronic device.
FIG. 29 is a front perspective view of an eighth embodiment of an assembly for coupling an external optical component to a portable electronic device.
Figure 30:
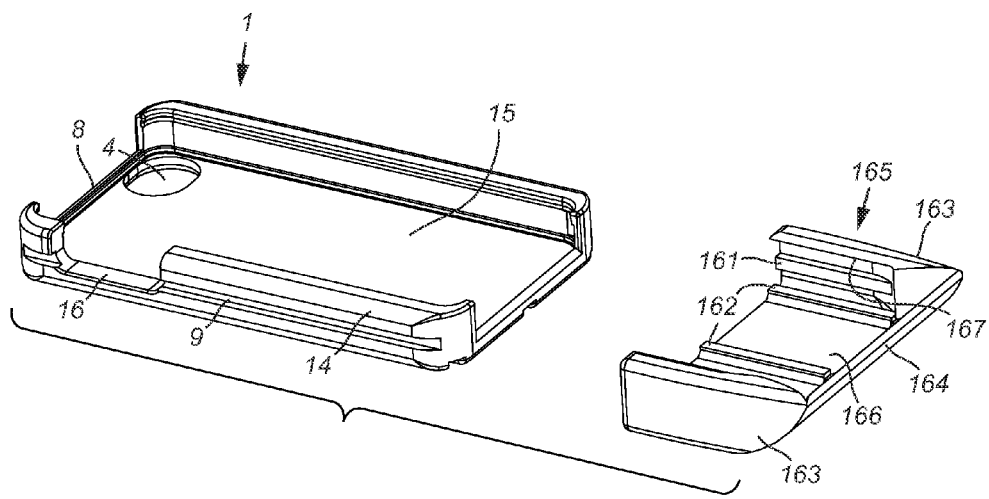
FIG. 30 is a perspective view of an embodiment for coupling an accessory to a portable electronic device case.

FIGS. 28-31 depict various coupling elements adapted to removably couple to a portable electronic device case 1, previously described in this document. Although one non-limiting embodiment of a portable electronic device case 1 is shown in FIGS. 28-30, it is contemplated that any of the portable electronic device cases may be utilized in a similar fashion, with the corresponding coupling elements adapted to couple to the respective portable electronic device case.

FIGS. 28 and 29 depict a non-limiting embodiment of a portable electronic device case 1, an optical component coupling 150, and a generic object 160 to which the optical component coupling 150 may be coupled to. In one or more embodiments, an optical component coupling 150 comprises a face plate 152 and two opposing side plates 151. The face plate 152 typically comprises a plurality of rear tongues 155 extending from an inner surface 153 of the face plate 152. The plurality of rear tongues 155 are positioned and sized to slidably engage with the plurality of rear grooves 5 of the portable electronic device case 1. In a particular example, the optical component coupling 150 comprises three rear tongues 155 positioned and sized to slidably engage with three rear grooves 5 on the portable electronic device case 1.

One or more embodiments of a optical component coupling 150 further comprise at least one tongue 154 extending from an inner surface 157 of the side plates 151 of the optical component coupling. The at least one tongue 154 is sized and positioned to slidably engaged with the at least one side groove 9 of the portable electronic device case 1. More particularly, one side tongue 154 of each side plate engages simultaneously engage with a side groove 9 while the plurality of rear tongues 155 engage with the plurality of rear grooves 5 when the optical component coupling 150 is removably coupled to the portable electronic device case 1.

The optical component coupling 150 typically comprises a shoulder, an optical component opening 100, and an optical component mount 156 extending from an outer surface 159 of the optical component coupling 150 similar to those previously described.

In one or more embodiments, the optical component coupling 150 is configured to removably mount to a generic object 160 such as but not limited to a benchtop microscope objective, a telescope, a binocular objective, a belt, or an armband. For example, the optical component coupling may comprise a threaded member, a clip, a clamp, a hook, a latch, a lock, a lug, a pin, and the like configured to removably couple and mount to a generic object 160.

Figure 31:
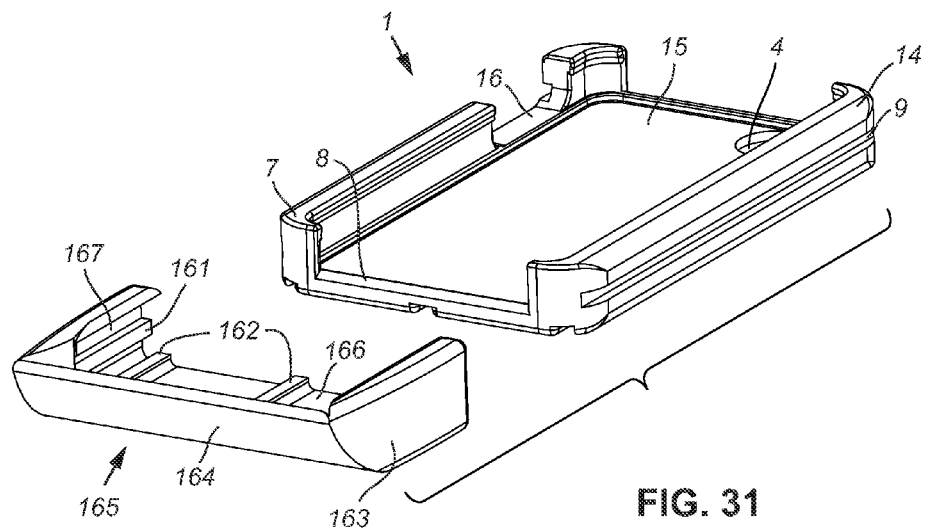
FIG. 31 is a bottom perspective view of an embodiment for coupling an accessory to a portable electronic device case.

FIGS. 30 and 31 depict a non-limiting embodiment of a portable electronic device case 1 and an accessory coupling 165. Similar to the optical component coupling 150, the accessory coupling 160 comprises a face plate 164 and two opposing side plates 163. Furthermore, the accessory coupling 165 typically comprises a plurality of rear tongues 162 extending from an inner surface 166 of the face plate 164. The plurality of rear tongues 162 are positioned and sized to slidably engage with the plurality of rear grooves 5 of the portable electronic device case 1. In a particular example, the accessory coupling 165 comprises three rear tongues 162 positioned and sized to slidably engage with three rear grooves 5 on the portable electronic device case 1. As opposed to the optical component coupling 150, the accessory coupling 165 typically removably couples to a bottom portion of the portable electronic device case 1.

One or more embodiments of an accessory coupling 165 further comprise at least one tongue 161 extending from an inner surface 167 of the side plates 163 of the optical component coupling. The at least one tongue 161 is sized and positioned to slidably engaged with the at least one side groove 9 of the portable electronic device case 1. More particularly, one side tongue 161 of each side plate engages simultaneously engage with a side groove 9 while the plurality of rear tongues 162 engage with the plurality of rear grooves 5 when the optical component coupling 150 is removably coupled to the portable electronic device case 1.

In contrast to the optical component coupling 150, the accessory coupling 165 typically does not include an optical component opening or a optical component mount because the accessory coupling typically couples to the bottom portion of the portable electronic device case 1 rather than the top portion. The accessory coupling typically does, however, include a shoulder similar to those previously described.

In one or more embodiments, the accessory coupling 165 comprises an acoustic flange that, when removably coupled to the portable electronic device case 1, enhances the audio produced from speakers of the portable electronic device removably coupled to the portable electronic device case 1. Different shapes and sizes of accessory coupling 165 are also contemplated as part of this disclosure. Moreover, various other accessory couplings for other purposes may similarly include rear tongues 162 and side tongues 161 for removably coupling to the portable electronic device case 1.

FIGS. 32 and 33 depict rear and front perspective views of another non-limiting embodiment of a portable electronic device case 170 and an optical component coupling 176. Similar to previously described portable electronic device cases, a portable electronic device case 170 comprises a rear wall 172 having an outer surface 177, two sidewalls 171, and a camera opening 174. The rear wall 172 further comprises one or more magnets 175 on the outer surface 177. In a particular embodiment, the rear wall 172 comprises two magnets 175 positioned on opposing sides of the camera opening 174 such that the camera opening 174 is between the two magnets 175.

Although not shown in detail in FIGS. 32 and 33, the optical component coupling 176 contemplated may comprise any of the optical component couplings described in this document. Accordingly, the optical coupling 176 may comprise one or more of a face plate, a side plate, and optical component opening, a shoulder, and the like. In other embodiments, the optical component coupling 176 comprises only a face plate. The optical component coupling 176 typically further comprises one or more magnets 173 positioned to operably couple to the one or more magnets 175 of the rear wall 172. The magnets 173, 176 may comprise any magnets and polarity that allows for removable coupling of the optical component coupling 176 to the portable electronic device case 170. In some embodiments, the magnets 173, 176 comprise Halbach arrays.

FIGS. 34 and 35 depict rear and front perspective views of another non-limiting embodiment of a portable electronic device case 180 and an optical component coupling 186. Similar to previously described portable electronic device cases, a portable electronic device case 180 comprises a rear wall 182 having an outer surface 187, two sidewalls 181, and a camera opening 184. The rear wall 182 further comprises one or more receivers 185 on the outer surface 187. In a particular embodiment, the rear wall 182 comprises four receivers 185 positioned such that the camera opening 184 is between the four receivers 185. The one or more receivers 185 are sized to receive one or pegs to snap fit and removably couple the optical component coupling 186 to the portable electronic device case 180.

Although not shown in detail in FIGS. 34 and 35, the optical component coupling 186 contemplated may comprise any of the optical component couplings described in this document. Accordingly, the optical coupling 186 may comprise one or more of a face plate, a side plate, and optical component opening, a shoulder, and the like. In other embodiments, the optical component coupling 186 comprises only a face plate. The optical component coupling 186 typically further comprises one or more pegs 183 positioned to removably couple to the one or more pegs 185 of the rear wall 182. In one or more embodiments, the receivers 185 and pegs 183 comprise magnets, such as but not limited to Halbach array magnets.

Figure 36:
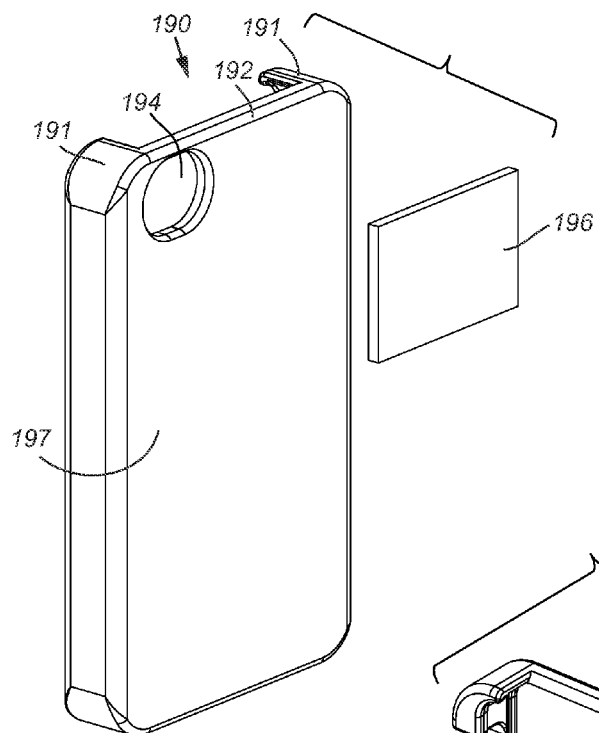
FIG. 36 is a front perspective view of an eleventh embodiment of an assembly for coupling an external optical component to a portable electronic device.
Figure 37:
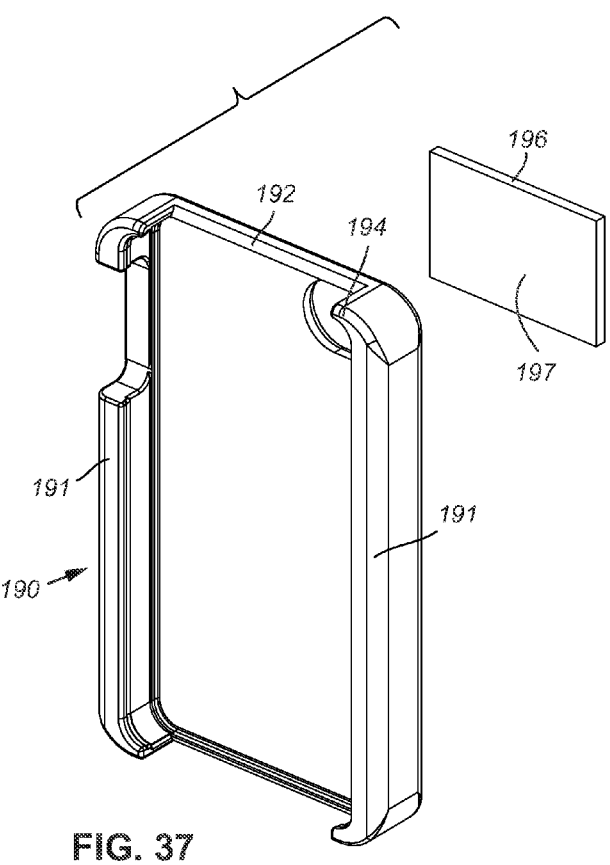
FIG. 37 is a rear perspective view of an eleventh embodiment of an assembly for coupling an external optical component to a portable electronic device.

FIGS. 36 and 37 depict rear and front perspective views of another non-limiting embodiment of a portable electronic device case 190 and an optical component coupling 196. Similar to previously described portable electronic device cases, a portable electronic device case 190 comprises a rear wall 192 having an outer surface 197, two sidewalls 191, and a camera opening 194. The outer surface 197 of the rear wall may comprise one or more areas of couplings, the couplings comprising one or more of a magnet, temporary adhesive, Velcro-type material, and the like.

Although not shown in detail in FIGS. 36 and 37, the optical component coupling 196 contemplated may comprise any of the optical component couplings described in this document. Accordingly, the optical coupling 196 may comprise one or more of a face plate, a side plate, and optical component opening, a shoulder, and the like. In other embodiments, the optical component coupling 196 comprises only a face plate. The optical component coupling 196 typically further comprises a coupling surface 197. The coupling surface 197 may comprise any of a variety of couplings, such as but not limited to a magnet, temporary adhesive, Velcro-type material, and the like.

As will become apparent to one having ordinary skill in the art upon review of this disclosure, the various embodiments of the assemblies presented herein are advantageous to those previously known in the art. Advantages of the assemblies include but are not limited to one or more of the following advantages. The ability to attach additional optics or lenses to offer new functionality and to enhance the capabilities of the built-in cameras of portable media devices. Various embodiments are compact and portable. Various embodiments may disassemble easily and quickly into parts that can fit into a pocket, purse, etc. Various embodiments are flexible and may accept multiple types of optics/lenses attachments. Various embodiments do not require a separate dedicated case for each type of optics/lens. Various embodiments do not require the user to remove their case; the case may be used without the optics/lens for everyday purposes. Various embodiments may apply to electronic devices of varying sizes and purposes, such as but not limited to smart phones, tablet computers, electronic readers, and the like. Various embodiments do not require adjustment or calibration of focal length, as it is already computed. Various embodiments may be compact, rugged, and small. Various embodiments have an ergonomic design, allowing a user to single handedly remove them, and comfortably use the electronic device. Various embodiments may be installed "on the fly" without needing tools. Various embodiments allow a microscope or other optical component to be very sturdy on its base without an intricate installation process. Various embodiments are able to easily use the existing camera and other features of the electronic device to enhance the optics. Various embodiments minimize the use of material to achieve maximum stability, strength, and functionality. Various embodiments leverage existing mobile optics technology augmented by a variety of optics/scopes/lenses.

It will be understood that implementations are not limited to the specific components disclosed herein, as virtually any components consistent with the intended operation of a method and/or system implementation for a portable electronic device case and optical component coupling may be utilized. Accordingly, for example, although particular portable electronic devices and optical component couplings may be disclosed, such components may comprise any shape, size, style, type, model, version, class, grade, measurement, concentration, material, weight, quantity, and/or the like consistent with the intended operation of a method and/or system implementation for a portable electronic device case and optical component coupling may be used.

Accordingly, the components defining device and assembly implementations for attaching external optical components to a portable electronic device may be formed of any of many different types of materials or combinations thereof that can readily be formed into shaped objects having a variety of interior and exterior surface textures provided that the components selected are consistent with the intended operation of a device and an assembly for coupling external optical components to a portable electronic device. For example, the components may be formed of one or more of the following: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, spring steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Various implementations may be manufactured using conventional procedures as added to and improved upon through the procedures described here. Some components may be manufactured simultaneously and integrally joined with one another, while other components may be purchased pre-manufactured or manufactured separately and then assembled with the integral components.

Manufacture of these components separately or simultaneously may involve extrusion, pultrusion, vacuum forming, injection molding, blow molding, resin transfer molding, casting, forging, cold rolling, milling, drilling, routing, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

In places where the description above refers to particular implementations of an assembly, it should be readily apparent that a number of modifications may be made without departing from the spirit thereof and that these implementations may be applied to other assemblies. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An assembly for coupling an external optical component to an portable electronic device, comprising:
    a portable electronic device case comprising a rear wall having an inner and an outer surface opposite the inner surface, two opposing sidewalls extending from the inner surface of the rear wall, a camera opening extending through the rear wall, at least one rear groove on the outer surface of the rear wall, and at least one side groove on a first sidewall of the two opposing sidewalls; and
    an optical component coupling configured to removably couple to the portable electronic device case, the optical component coupling comprising a face plate, a side plate coupled to the face plate, at least one rear tongue positioned on the face plate to engage with the at least one rear groove when the optical component coupling is coupled to the portable electronic device case, at least one side tongue positioned on the side plate to engage with the at least one side groove when the optical component coupling is coupled to the portable electronic device case, an optical component mount adjacent the face plate and positioned to align with the camera opening when the optical component coupling is coupled to the portable electronic device case, and a shoulder positioned on the optical component coupling to abut the portable electronic device case when the optical component mount is aligned with the camera opening.

2. The assembly of claim 1, wherein the optical component mount extends from an outer surface of the face plate and comprises an optical component opening aligned with the camera opening and extending through the face plate.

3. The assembly of claim 1, wherein the at least one rear tongue comprises at least two rear tongues, the at least one rear groove comprises at least two rear grooves, and the camera opening is positioned between two of the at least two rear grooves.

4. The assembly of claim 3, further comprising a rib disposed in at least a first rear groove of the at least two rear grooves positioned between the camera opening and the first sidewall, and a depression on a first rear tongue of the at least two rear tongues positioned between the optical component mount and the side plate, the depression disposed on the first rear tongue to engage with the rib when the optical component coupling is coupled to the portable electronic device case.

5. The assembly of claim 4, wherein the at least one side groove comprises one side groove positioned on the first sidewall opposite the first rear groove, and the at least one side tongue comprises one side tongue positioned on a front plate of the optical component coupling extending from the side plate opposite the face plate.

6. The assembly of claim 5, wherein the side groove comprises a rib and the side tongue comprises a depression positioned to engage with the rib of the side groove when the optical component coupling is coupled to the portable electronic device case.

7. The assembly of claim 6, further comprising a gripping element extending from the optical component coupling.

8. The assembly of claim 3, wherein the at least two grooves comprise at least two primary grooves and the portable electronic device case further comprises one or more second grooves perpendicular to the primary grooves on the outer surface of the rear wall.

9. The assembly of claim 1, wherein the at least one rear groove comprises one rear groove comprising a rib, the at least one side groove comprises one side groove comprises one side groove comprising a rib, the at least one rear tongue comprises one rear tongue comprising a depression positioned to engage with the rib of the rear groove when the optical component coupling is coupled to the portable electronic device case, and the at least one side tongue comprises one side tongue comprising a depression positioned to engage with the rib of the side groove when the optical component coupling is coupled to the portable electronic device case and the optical component opening is aligned with the camera opening.

10. The assembly of claim 1, wherein the at least one rear groove is positioned between a protrusion on the outer surface of the rear wall and the outer surface of the rear wall.

11. The assembly of claim 10, wherein the at least one rear groove comprise a substantially vertical first groove and a substantially horizontal second groove, and the at least one rear tongue comprises a first tongue positioned to engage with the first groove and a second tongue positioned to engage with the second groove when the optical component coupling is coupled to the portable electronic device case.

12. The assembly of claim 11, wherein the side tongue comprises a T-shaped side tongue and the side groove comprises a T-shaped side groove.

13. The assembly of claim 1, wherein optical component is coupled to the optical component mount and comprises one of a spectrometer, a magnifying optical component, a light filter, a telescope, a night vision optical component, a spotting scope, and a bore scope.

14. A portable electronic device case, comprising:
    a rear wall comprising an inner surface and an outer surface opposite the inner surface;
    at least two rear grooves on the outer surface of the rear wall, the at least two rear grooves being substantially parallel to one another;
    two opposing sidewalls extending from the inner surface of the rear wall;
    a side groove on a first sidewall of the two opposing sidewalls;
    a camera opening extending through the rear wall and positioned between two of the at least two rear grooves on the outer surface;
    an optical component coupling configured to removably and slidably couple to the portable electronic device case, the optical component coupling comprising a face plate, a side plate coupled to the face plate, at least two rear tongues positioned on the face plate to slidably engage with the at least two rear grooves when the optical component coupling is coupled to the portable electronic device case, a first side tongue positioned on the side plate to slidably engage with the side groove when the optical component coupling is coupled to the portable electronic device case, an optical component opening extending through the face plate and positioned to align with the camera opening when the optical component coupling is coupled to the portable electronic device case, and a shoulder positioned on the optical component coupling to abut the portable electronic device case when the optical component opening is aligned with the camera opening; and
    an optical component coupled to the face plate and aligned with the optical component opening, the optical component comprising at least one of a spectrometer, a magnifying optical component, a light filter, a telescope, a night vision optical component, a spotting scope, and a bore scope.

15. The assembly of claim 14, further comprising a second side tongue on the side plate opposite the face plate and substantially parallel to the first side tongue, the first and second side tongues positioned to hold a portion of the side plate between the first and second side tongues when the optical component coupling is coupled to the portable electronic device case.

16. The assembly of claim 14, further comprising:
    one or more ribs in at least one of side groove or the at least two rear grooves;
    one or more depressions on at least one of the side tongue or the at least two rear tongues, the one or more depressions positioned to engage with the one or more ribs when the optical component coupling is coupled to the portable electronic device case and the optical component opening is aligned with the camera opening.

17. An optical component coupling for coupling an optical component to a portable electronic device case, comprising:
    a face plate;
    a side plate coupled to the face plate;
    at least one rear tongue positioned on the face plate to engage with at least one rear groove on the portable electronic device case;
    at least one side tongue positioned on the side plate to engage with at least one side groove on the portable electronic device case;
    a shoulder positioned on the optical component coupling to abut the portable electronic device case when the optical component coupling is coupled to the portable electronic device case;
    an optical component opening extending through the face plate and positioned to align with a camera opening on the portable electronic device case when the optical component coupling is coupled to the portable electronic device case; and
    an optical component coupled to the face plate and aligned with the optical component opening, the optical component comprising at least one of a spectrometer, a magnifying optical component, a light filter, a telescope, a night vision optical component, a spotting scope, and a bore scope.

18. The optical component coupling of claim 17, wherein the at least one rear tongue comprises one rear tongue comprising a depression positioned to engage with a rib on the rear groove of the portable electronic device case when the optical component coupling is coupled to the portable electronic device case, and the at least one side tongue comprises one side tongue comprising a depression positioned to engage with a rib on the side groove of the portable electronic device case when the optical component coupling is coupled to the portable electronic device case and the optical component opening is aligned with the camera opening of the portable electronic device case.

19. The optical component coupling of claim 17, further comprising a gripping element extending from the optical component coupling.

* * * * *